US007817866B2

(12) United States Patent
Yang

(10) Patent No.: US 7,817,866 B2
(45) Date of Patent: Oct. 19, 2010

(54) PROCESSING MULTIVIEW VIDEO

(75) Inventor: Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 860 days.

(21) Appl. No.: 11/622,618

(22) Filed: Jan. 12, 2007

(65) Prior Publication Data

US 2007/0177813 A1  Aug. 2, 2007

Related U.S. Application Data

(60) Provisional application No. 60/758,234, filed on Jan. 12, 2006, provisional application No. 60/759,620, filed on Jan. 18, 2006, provisional application No. 60/762,534, filed on Jan. 27, 2006, provisional application No. 60/787,193, filed on Mar. 30, 2006, provisional application No. 60/818,274, filed on Jul. 5, 2006, provisional application No. 60/830,087, filed on Jul. 12, 2006, provisional application No. 60/830,328, filed on Jul. 13, 2006.

(30) Foreign Application Priority Data

| Jan. 17, 2006 | (KR) | ...................... 10-2006-0004956 |
| Mar. 24, 2006 | (KR) | ...................... 10-2006-0027100 |
| Apr. 26, 2006 | (KR) | ...................... 10-2006-0037773 |
| Nov. 9, 2006 | (KR) | ...................... 10-2006-0110337 |
| Nov. 9, 2006 | (KR) | ...................... 10-2006-0110338 |

(51) Int. Cl.
*G06K 9/36* (2006.01)

(52) U.S. Cl. ...................... 382/233; 382/232; 382/236; 382/239

(58) Field of Classification Search ................. 382/154, 382/232, 233, 236, 239; 348/211.3, 143, 348/211.11, 231.2; 375/240.12; 725/105
See application file for complete search history.

(56) References Cited

U.S. PATENT DOCUMENTS

| 6,055,012 | A | 4/2000 | Haskell et al. |
| 7,444,664 | B2 * | 10/2008 | Lou et al. ................... 725/105 |
| 7,613,344 | B2 * | 11/2009 | Kim et al. ................... 382/232 |
| 7,671,893 | B2 * | 3/2010 | Li et al. ................... 348/211.3 |
| 7,710,462 | B2 | 5/2010 | Xin et al. ................. 348/218.1 |

(Continued)

FOREIGN PATENT DOCUMENTS

EP    1418762    5/2004

(Continued)

OTHER PUBLICATIONS

"Description of Core Experiments in MVC." *International Organisation for Standardisation, ISO/IEC JTC1/SC29/WG11*, No. MPEG2006/W8019, Montreux, Switzerland, Apr. 2006, 38 pages.

Lee, Sang-Heon et al., "Inter-view motion information prediction method in MVC," *Joint Video Team (JVT) of ISO/IEC MPEG & ITU-T VCEG (ISO/IEC JTC1/SC29/WG11 and ITU-T SG16 Q.6) 20th Meeting*: Klagenfurt, Austria, Jul. 15-21, 2006, Document: JVT-T135, Filename: JVT-T135.doc, 13 pages.

(Continued)

*Primary Examiner*—Anh Hong Do
(74) *Attorney, Agent, or Firm*—Fish & Richardson P.C.

(57) ABSTRACT

Decoding a multiview video signal comprises receiving a bitstream comprising the multiview video signal encoded according to dependency relationships between respective views, and view-dependency information representing the dependency relationships in a two-dimensional data structure; extracting the two-dimensional data structure and determining the dependency relationships from the extracted data structure; and decoding the multiview video signal according to the determined dependency relationships.

10 Claims, 16 Drawing Sheets

U.S. PATENT DOCUMENTS

| | | | |
|---|---|---|---|
| 7,728,878 B2 | 6/2010 | Yea et al. | 348/218.1 |
| 2003/0202592 A1 | 10/2003 | Sohn et al. | 375/240.16 |
| 2004/0247159 A1 | 12/2004 | Damera-Venkata et al. | 382/107 |
| 2006/0132610 A1 | 6/2006 | Xin et al. | 348/207.99 |
| 2006/0146143 A1 | 7/2006 | Xin et al. | 348/218.1 |

FOREIGN PATENT DOCUMENTS

| | | |
|---|---|---|
| EP | 1515550 A1 | 3/2005 |
| KR | 2002-0032954 | 5/2002 |
| KR | 10-0375708 | 2/2003 |
| KR | 1020040013540 | 12/2004 |
| KR | 1020050122717 | 12/2005 |
| WO | WO 2005/018217 A2 | 2/2005 |
| WO | WO 2005/069630 | 7/2005 |
| WO | WO 2006/014057 | 2/2006 |
| WO | WO 2006/062377 | 6/2006 |

OTHER PUBLICATIONS

Senoh, Taka et al., "Disparity Vector Prediction CE Plan for MVC/CE4. " *International Organisation for Standardisation, ISO/IEC JTC1/SC29/WG11*, No. M13166, Montreux, Switzerland, Apr. 2006, 6 pages.

Supplementary European Search Report issued in European Application No. EP 07768721, mailed Feb. 2, 2010, 3 pages.

Zhu, Gang et al., "Inter-view Direct Mode in MVC." *International Organisation for Standardisation, ISO/IEC JTC1/SC29/WG11*, No. MPEG2006/m13177, Montreux, Switzerland, Apr. 2006, 5 pages.

Joaquin Lopez, Jae Hoon Kim, Antonio Ortega, and George Chen, "Block-based Illumination Compensation and Search Techniques for Multiview Video Coding," *Picture Coding Symposium*, San Francisco, CA, Dec. 2004.

P. Kauff, A. Smolic, P. Eisert, C. Fehn, K. Müller, and R. Schäfer "Data Format and Coding for Free Viewpoint Video," Proc. International Broadcast Convention IBC 2005, Amsterdam, Netherlands, pp. , Sep. 2005.

Hideaki Kimata, Masaki Kitahara, Kazuto Kamikura, and Yoshiyuki Yashima. "Free-viewpoint Video Communication Using Multi-view Video Coding", NTT Technical Review Online, Aug. 2004 vol. 2 No. 8, 3-D Display and Information Technologies.

A. Smolic, K. Müller, P. Merkle, C. Fehn. P. Kauff, P. Eisert, and T. Wiegand, "3D Video and Free Viewpoint Video—Technologies, Applications and MPEG Standards", In Proceedings of International Conference on Multimedia & Expo, pp. 2161-2164. Jul. 2006.

ISO/EIC JTC1/SC29/WG11, "Survey of Algorithms used for Multi-view Video Coding (MVC)", Hong Kong, China, Jan. 2005.

Wenxian Yang; Feng Wu; Yan Lu; Jianfei Cai; King Ngi Ngan Shipeng Li, "Scalable multiview video coding using wavelet" Nanyang Technol., Univ., Singapore; IEEE International Symposium on Circuits and Systems, May 2005.

Smolic, A.; Kimata, H.; Vetro, A., "Development of MPEG Standards for 3D and Free Viewpoint Video", SPIE Conference Optics East 2005; Communications, Multimedia & Display Technologies, vol. 6014, pp. 262-273, Nov. 2005.

Merkle, P. Muller, K. Smolic, A. Wiegand, T., "Efficient Compression of Multi-View Video Exploiting Inter-View Dependencies Based on H.264/MPEG4-AVC", In Proceedings of International Conference on Multimedia & Expo, pp. 2161-2164, Jul. 2006.

Kimata, H. Kitahara, M. Kamikura, K. Yashima, Y., "Hierarchical references picture selection method for temporal scalability beyond H.267" In Proceedings of International Conference on Multimedia & Expo, pp. 181-184, Jun. 2004.

Smolic, A. and Kauff, P., "Interactive 3-D video representation and coding technologies" Proceedings of the IEEE, Publication Date: Jan. 2005, vol. 93, Issue: 1, pp. 98-110.

Sang Huyn Kim and Rae-Hong Park, "Fast local motion-compensation algorithm for video sequences with brightness variations", IEEE Transactions on Circuits and Systems for Video Technology, Publication Date: Apr. 2003, vol. 13, Issue: 4, pp. 289-299.

"Advanced video coding for generic audiovisual services; H.264 (05/03)," ITU-T Standard Superseded(s), International Telecommunication Union, Geneva, CH, No. H.264 (05/03), May 30, 2003, pp. 110-123.

Kim, Jae Hoon et al., "Dependent Bit Allocation in Multiview Video Coding." IEEE International Conference on Genova, Italy, Sep. 11-14, 2005, Piscataway, NJ, USA, vol. 2, Sep. 11, 2005, pp. 293-296.

Lee, Yung-Lyul et al., "Multi-view Video Coding Using Illumination Change-Adaptive Motion Estimation and 2-D Direct Mode." PCM 2005, Part I, LNCS 3767, Jan. 1, 2005, Springer-Verlag Berlin Heidelberg, Germany, 2005, pp. 396-407.

Lee, Yung-Lyul et al., "Result of CE2 on Multi-view Video Coding." International Organization for Standardization, ISO/IEC JTC1/SC29/WG11, MPEG2006/M13143, Jan. 2006, Switzerland, Montreux, pp. 1-12.

Lee, Yung-Lyul et al., "Result of CE2 on Multi-view Video Coding." International Organization for Standardization, ISO/IEC JTC1/SC29/WG11, MPEG2006/M13498, Jul. 2006, Klagenfurt, Austria, pp. 1-23.

Li, Shiping et al., "Approaches to H.264-Based Stereoscopic Coding." Proceedings of the Third International Conference on Image and Graphics (ICIG'04), Dec. 18-20, 2004, Dec. 18, 2004, pp. 365-368.

Ohm, Jens-Rainer, "Stereo/Multiview Video Encoding Using the MPEG Family of Standards." Part of the IS&T/SPIE Conference on Stereoscopic Displays and Applications X, San Jose, California, Jan. 1998, SPIE vol. 3639, pp. 242-253.

Supplementary European Search Report issued in application No. EP07700952, dated May 18, 2010, 9 pages.

Supplementary European Search Report issued in application No. EP07700955, dated May 18, 2010, 10 pages.

Notice of Allowance issued in U.S. Appl. No. 11/622,611, dated Apr. 30, 2010, 8 pages.

* cited by examiner

FIG. 2

| (S1)  | seq_parameter_set_rbsp( ){ |
|---|---|
| (S2)  | profile_idc |
| (S3)  | If ( profile_idc ==MULTI_VIEW_PROFILE ) |
| (S4)  | reference_view |
| (S5)  | num_views |
| (S6)  | view_arrangement |
| (S7)  | temporal_units_size |
| (S8)  | constraint_set0_flag |
| (S9)  | constraint_set1_flag |
| (S10) | constraint_set2_flag |
| (S11) | constraint_set4_flag |
| (S12) | level_idc |
| (S13) | seq_parameter_set_id |
|  | ⋮ |
|  | } |

FIG. 3A

| SPS (Sequence Parameter Set) | SEI | PPS (Picture Parameter Set) | I slice | Picture delimiter | P slice | P slice |

| | | | | | | | | | |
|---|---|---|---|---|---|---|---|---|---|
| m=1 | 0 | | | | | | | | |
| m=2 | 0 | 0 | | | | | | | |
| m=3 | 0 | 1 | 0 | | | | | | |
| m=4 | 0 | 2 | 1 | 0 | | | | | |
| m=5 | 0 | 2 | 1 | 2 | 0 | | | | |
| m=6 | 0 | 2 | 2 | 1 | 2 | 0 | | | |
| m=7 | 0 | 2 | 2 | 1 | 2 | 2 | 0 | | |
| m=8 | 0 | 3 | 2 | 3 | 1 | 3 | 3 | 0 | |
| m=9 | 0 | 3 | 2 | 3 | 1 | 3 | 2 | 3 | 0 |
| m=10 | 0 | 3 | 3 | 2 | 3 | 1 | 3 | 2 | 3 | 0 |

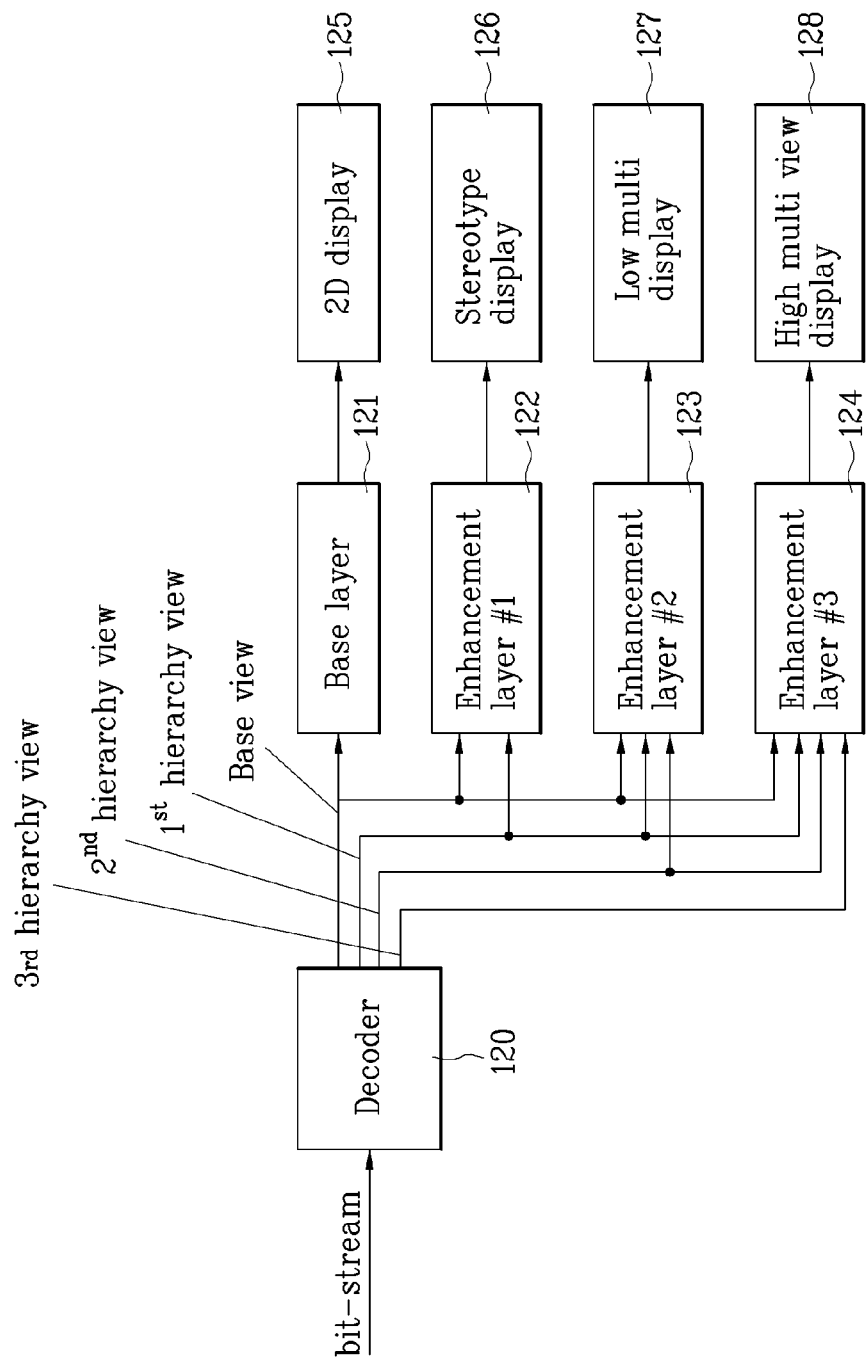

PROCESSING MULTIVIEW VIDEO

CROSS-REFERENCE TO RELATED APPLICATIONS

This application claims the benefit of U.S. Application Ser. No. 60/758,234 filed on Jan. 12, 2006, U.S. Application Ser. No. 60/759,620 filed on Jan. 18, 2006, U.S. Application Ser. No. 60/762,534 filed on Jan. 27, 2006, U.S. Application Ser. No. 60/787,193 filed on Mar. 30, 2006, U.S. Application Ser. No. 60/818,274 filed on Jul. 5, 2006, U.S. Application Ser. No. 60/830,087 filed on Jul. 12, 2006, U.S. Application Ser. No. 60/830,328 filed on Jul. 14, 2006, Korean Application No. 10-2006-0004956 filed on Jan. 17, 2006, Korean Application No. 10-2006-0027100 filed on Mar. 24, 2006, Korean Application No. 10-2006-0037773 filed on Apr. 26, 2006, Korean Application No. 10-2006-0110337 filed on Nov. 9, 2006, and Korean Application No. 10-2006-0110338 filed on Nov. 9, 2006, each of which is incorporated herein by reference.

This application is related to U.S. application Ser. No. 11/622,591 titled "PROCESSING MULTIVIEW VIDEO", U.S. application Ser. No. 11/622,592 titled "PROCESSING MULTIVIEW VIDEO", U.S. application Ser. No. 11/622,611 titled "PROCESSING MULTIVIEW VIDEO", U.S. application Ser. No. 11/622,709 titled "PROCESSING MULTIVIEW VIDEO", U.S. application Ser. No. 11/622,675 titled "PROCESSING MULTIVIEW VIDEO", U.S. application Ser. No. 11/622,803 titled "PROCESSING MULTIVIEW VIDEO", U.S. application Ser. No. 11/622,681 titled "PROCESSING MULTIVIEW VIDEO", each of which is being filed concurrently with the present application, and each of which is also incorporated herein by reference.

BACKGROUND

The invention relates to processing multiview video.

Multiview Video Coding (MVC) relates to compression of video sequences (e.g., a sequence of images or "pictures") that are typically acquired by respective cameras. The video sequences or "views" can be encoded according to a standard such as MPEG. A picture in a video sequence can represent a full video frame or a field of a video frame. A slice is an independently coded portion of a picture that includes some or all of the macroblocks in the picture, and a macroblock includes blocks of picture elements (or "pixels").

The video sequences can be encoded as a multiview video sequence according to the H.264/AVC codec technology, and many developers are conducting research into amendment of standards to accommodate multiview video sequences.

Three profiles for supporting specific functions are prescribed in the current H.264 standard. The term "profile" indicates the standardization of technical components for use in the video encoding/decoding algorithms. In other words, the profile is the set of technical components prescribed for decoding a bitstream of a compressed sequence, and may be considered to be a sub-standard. The above-mentioned three profiles are a baseline profile, a main profile, and an extended profile. A variety of functions for the encoder and the decoder have been defined in the H.264 standard, such that the encoder and the decoder can be compatible with the baseline profile, the main profile, and the extended profile respectively.

The bitstream for the H.264/AVC standard is structured according to a Video Coding Layer (VCL) for processing the moving-image coding (i.e., the sequence coding), and a Network Abstraction Layer (NAL) associated with a subsystem capable of transmitting/storing encoded information. The output data of the encoding process is VCL data, and is mapped into NAL units before it is transmitted or stored. Each NAL unit includes a Raw Byte Sequence Payload (RBSP) corresponding to either compressed video data or header information.

The NAL unit includes a NAL header and a RBSP. The NAL header includes flag information (e.g., nal_ref_idc) and identification (ID) information (e.g., nal_unit_type). The flag information "nal_ref_idc" indicates the presence or absence of a slice used as a reference picture of the NAL unit. The ID information "nal_unit_type" indicates the type of the NAL unit. The RBSP stores compressed original data. An RBSP trailing bit can be added to the last part of the RBSP, such that the length of the RBSP can be represented by a multiple of 8 bits.

There are a variety of the NAL units, for example, an Instantaneous Decoding Refresh (IDR) picture, a Sequence Parameter Set (SPS), a Picture Parameter Set (PPS), and Supplemental Enhancement Information (SEI), etc.

The standard has generally defined a target product using various profiles and levels, such that the target product can be implemented with appropriate costs. The decoder satisfies a predetermined constraint at a corresponding profile and level.

The profile and the level are able to indicate a function or parameter of the decoder, such that they indicate which compressed images can be handled by the decoder. Specific information indicating which one of multiple profiles corresponds to the bitstream can be identified by profile ID information. The profile ID information "profile_idc" provides a flag for identifying a profile associated with the bitstream. The H.264/AVC standard includes three profile identifiers (IDs). If the profile ID information "profile_idc" is set to "66", the bitstream is based on the baseline profile. If the profile ID information "profile_idc" is set to "77", the bitstream is based on the main profile. If the profile ID information "profile_idc" is set to "88", the bitstream is based on the extended profile. The above-mentioned "profile_idc" information may be contained in the SPS (Sequence Parameter Set), for example.

SUMMARY

In one aspect, in general, a method for decoding a video signal comprises: receiving a bitstream comprising the video signal encoded according to a first profile that represents a selection from a set of profiles that includes multiple profiles for single view video signals and at least one profile for a multiview video signal, and profile information that identifies the first profile; extracting the profile information from the bitstream; and decoding the video signal according to the determined profile.

Aspects can include one or more of the following features.

The method further comprises extracting from the bitstream configuration information associated with multiple views when the determined profile corresponds to a multiview video signal, wherein the configuration information comprises at least one of view-dependency information representing dependency relationships between respective views, view identification information indicating a reference view, view-number information indicating the number of views, view level information for providing view scalability, and view-arrangement information indicating a camera arrangement. For example, the configuration information can be extracted in response to determining that the profile corresponds to a multiview video signal.

The profile information is located in a header of the bitstream.

The view-dependency information represents the dependency relationships in a two-dimensional data structure.

The two-dimensional data structure comprises a matrix.

The view level information corresponds to a plurality of levels assigned to views according to a hierarchical view prediction structure among the views of the multiview video signal.

Multiple portions of a given picture pictures of a given view are associated with respective identifiers indicating a corresponding level.

The multiple portions correspond to independent slices of the given picture.

Each slice corresponds to a full picture.

Pictures of a view assigned a given level are predicted from pictures of a view assigned a level lower than the given level.

Pictures of a single view assigned the lowest level are not predicted from pictures of another level.

The hierarchical view prediction structure includes a single base view and multiple auxiliary views, wherein pictures in a first level view are predicted on the basis of pictures in the base view and pictures in a given higher level view are predicted on the basis of views in lower levels than the level of the given higher level view.

In another aspect, in general, a method for decoding a multiview video signal comprises: receiving a bitstream comprising the multiview video signal encoded according to dependency relationships between respective views, and view-dependency information representing the dependency relationships in a two-dimensional data structure; extracting the two-dimensional data structure and determining the dependency relationships from the extracted data structure; and decoding the multiview video signal according to the determined dependency relationships.

Aspects can include one or more of the following features.

The two-dimensional data structure comprises a matrix.

The method further comprises extracting from the bitstream configuration information comprising at least one of view identification information indicating a reference view, view-number information indicating the number of views, view level information for providing view scalability, and view-arrangement information indicating a camera arrangement.

The view level information corresponds to a plurality of levels assigned to views according to a hierarchical view prediction structure among the views of the multiview video signal.

Multiple portions of a given picture pictures of a given view are associated with respective identifiers indicating a corresponding level.

The multiple portions correspond to independent slices of the given picture.

Each slice corresponds to a full picture.

Pictures of a view assigned a given level are predicted from pictures of a view assigned a level lower than the given level.

Pictures of a single view assigned the lowest level are not predicted from pictures of another level.

The hierarchical view prediction structure includes a single base view and multiple auxiliary views, wherein pictures in a first level view are predicted on the basis of pictures in the base view and pictures in a given higher level view are predicted on the basis of views in lower levels than the level of the given higher level view.

In another aspect, in general, for each respective decoding method, a method for encoding a video signal comprises generating a bitstream capable of being decoded into the video signal by the respective decoding method. For example, in another aspect, in general, a method for encoding a bitstream comprises: forming the bitstream according to a first profile that represents a selection from a set of profiles that includes multiple profiles for single view video signals and at least one profile for a multiview video signal, and profile information that identifies the first profile. In another aspect, in general, a method for encoding a bitstream comprises: forming the bitstream according to dependency relationships between respective views, and view-dependency information representing the dependency relationships in a two-dimensional data structure.

In another aspect, in general, for each respective decoding method, a computer program, stored on a computer-readable medium, comprises instructions for causing a computer to perform the respective decoding method.

In another aspect, in general, for each respective decoding method, image data embodied on a machine-readable information carrier is capable of being decoded into a video signal by the respective decoding method.

In another aspect, in general, for each respective decoding method, a decoder comprises means for performing the respective decoding method.

In another aspect, in general, for each respective decoding method, an encoder comprises means for generating a bitstream capable of being decoded into a video signal by the respective decoding method.

In another aspect, in general, a method for encoding a multiview sequence comprises: generating a bitstream by encoding images acquired at several views (i.e., multiview), wherein if the number of the multiview (m) is set to $2^{n-1} < m \leq 2^n$, the bitstream includes a single base-view bitstream and N hierarchical auxiliary-view bitstream.

In another aspect, in general, there is provided a method for encoding a multiview sequence comprising: generating a bitstream by encoding images acquired at two-dimensional (2D) several views (i.e., 2D multiview), wherein if the number (m) of the 2D multiview on a horizontal axis is set to $2^{n-1} < m \leq 2^n$, and the number (p) of the 2D multiview on a vertical axis is set to $2^{k-1} < p \leq 2^k$, the bitstream includes a single base-view bitstream and (n+k) hierarchical auxiliary-view bitstreams.

In yet another aspect, in general, there is provided a method for decoding a multiview sequence comprising: receiving an encoded bitstream of images acquired at several views (i.e., multiview), wherein if the number of the multiview (m) is set to $2^{n-1} < m \leq 2^n$, the bitstream includes a single base-view bitstream and n hierarchical auxiliary-view bitstream, and selectively decodes the base-view stream and/or the n hierarchical auxiliary-view bitstream according to the received bitstream.

In yet another aspect, in general, there is provided a method for decoding a multiview sequence comprising: receiving a bitstream by encoding images acquired at two-dimensional (2D) several views (i.e., 2D multiview), wherein if the number (m) of the 2D multiview on a horizontal axis is set to $2^{n-1} < m \leq 2^n$, and the number (p) of the 2D multiview on a vertical axis is set to $2^{k-1} < p \leq 2^k$, the bitstream includes a single base-view bitstream and (n+k) hierarchical auxiliary-view bitstreams, and selectively decodes the base-view bitstream and/or the (n+k) hierarchical auxiliary-view bitstreams according to the received bitstream.

In yet another aspect, in general, there is provided a method for encoding a multiview sequence comprising: generating a bitstream by encoding images acquired at m views (i.e., multiview of m), wherein the bitstream includes a single base-view bitstream and at least one auxiliary-view bitstream, both ends of the multiview are set to first views, respectively, a center view from among the multiview is set to a second view, views successively arranged by skipping over at least one view in both directions on the basis of the second view are set to third views, respectively, the remaining views other than the first to third views are set to fourth views, respectively, and any one of the first to third views is set to a base-view for independent encoding, and the remaining views other than the base-view are set to auxiliary-views for predictive coding.

In yet another aspect, in general, there is provided a method for encoding a multiview sequence comprising: generating a bitstream by encoding images acquired at m views (i.e., multiview of m), wherein the bitstream includes a single base-view bitstream and at least one auxiliary-view bitstream, a location of the base-view is set to a view located at a center part of the multiview, locations of a second auxiliary-view are set to views located at both ends of the multiview, and locations of a first auxiliary-view are successively arranged by skipping over at least one view in both directions on the basis of the base-view.

In yet another aspect, in general, there is provided a method for decoding a multiview sequence comprising: receiving an encoded bitstream of images acquired at m views (i.e., multiview of m), wherein the bitstream includes a single base-view bitstream and at least one auxiliary-view bitstream, a base-view image from among the received bitstream is recovered by independently decoding data of a center view from among the multiview, an image of a first auxiliary-view is recovered using the base-view image from among the received bitstream, the first auxiliary-view being views successively arranged by skipping over at least one view in both directions on the basis of the base-view, and an image of second auxiliary-views is recovered using the base-view image from among the received bitstream, the second auxiliary-views being views located at both ends of the multiview.

In yet another aspect, in general, there is provided a method for decoding a multiview sequence comprising: receiving an encoded bitstream of images acquired at m views (i.e., multiview of m), wherein the bitstream includes a single base-view bitstream and at least one auxiliary-view bitstream; reading out location information of a base-view from the received bitstream, recognizing the locations of the base-view and the auxiliary-view through the location information, and recovering images of the base-view and the auxiliary-view, wherein the location information of the base-view is indicative of any one of a first view located at both ends of the multiview, a second view located at the center of the multiview, and a third view successively arranged by skipping over at least one over in both directions on the basis of the second view.

In yet another aspect, in general, a method for encoding a video sequence comprises: selecting at least one profile from among several profiles when a bitstream is generated; and including at least one configuration information associated with a video sequence in the profile.

In yet another aspect, in general, there is provided a method for decoding a video sequence comprising: extracting at least one profile information from a received bitstream; extracting at least one configuration information contained in the profile on the basis of the extracted profile information; and decoding the bitstream using the extracted configuration information.

In yet another aspect, in general, there is provided an apparatus for encoding a video sequence comprising: means for selecting at least one profile from among several profiles when a bitstream is generated; and means for including at least one configuration information of the received video sequence in the selected profile.

In yet another aspect, in general, there is provided an apparatus for decoding a video sequence comprising: means for extracting at least one profile information from a received bitstream; means for extracting at least one configuration information contained in the profile on the basis of the extracted profile information; and means for decoding the bitstream using the extracted configuration information.

Aspects can have one or more of the following advantages.

The method for encoding/decoding a multiview sequence can effectively encode the multiview sequence. During the decoding of the multiview sequence, individual views can be hierarchically displayed during the decoding of the multiview sequence. The method establishes a prediction structure of individual-view images during the encoding of the multiview sequence. Therefore, although the multiview number increases and the array is extended, the method can extend the prediction structure in the same manner as in the above-mentioned preferred embodiments. In addition, the method performs a view scalability function of the multiview using a hierarchical structure, such that it can perform the encoding/decoding process to be suitable for a variety of displays contained in the reception end, resulting in the implementation of an effective encoding/decoding system.

The method for encoding/decoding a video sequence transmits the "num_views" information indicating the number of views to the encoder and the decoder when handling a multiview sequence captured by several cameras. The encoding/decoding method can designate a reference view acting as a base of the entire view. The reference-view sequences can be encoded without referring to another-view sequence, independent of each other. The encoding/decoding method can effectively perform the encoding/decoding processes according to individual arrangements by referring to "view_arrangement" information.

The encoding/decoding method can identify the profile type, can add a variety of configurations associated with a video sequence, and can effectively perform the encoding/decoding processes using the added information.

Other features and advantages will become apparent from the following description, and from the claims.

DESCRIPTION OF DRAWINGS

FIG. 2 is a structural diagram illustrating a sequence parameter set RBSP syntax.

FIG. 3A is a structural diagram illustrating a bitstream including only one sequence.

FIGS. 6A-6B, 7A-7B, and 8 are diagrams illustrating examples of multiview-sequence prediction structures.

FIGS. 11A-11C are diagrams illustrating a multiview sequence prediction structure.

FIG. 12 is a diagram illustrating a hierarchical encoding/decoding system.

DESCRIPTION

In order to effectively handle a multiview sequence, an input bitstream includes information that allows a decoding apparatus to determine whether the input bitstream relates to a multiview profile. In cases that it is determined that the input bitstream relates to the multiview profile, supplementary information associated with the multiview sequence is added according to a syntax to the bitstream and transmitted to the decoder. For example, the multiview profile ID can indicate a profile mode for handling multiview video data as according to an amendment of the H.264/AVC standard.

The MVC (Multiview Video Coding) technology is an amendment technology of the H.264/AVC standards. That is, a specific syntax is added as supplementary information for an MVC mode. Such amendment to support MVC technology can be more effective than an alternative in which an unconditional syntax is used. For example, if the profile identifier of the AVC technology is indicative of a multiview profile, the addition of multiview sequence information may increase a coding efficiency.

The sequence parameter set (SPS) of an H.264/AVC bitstream is indicative of header information including information (e.g., a profile, and a level) associated with the entire-sequence encoding.

The entire compressed moving images (i.e., a sequence) can begin at a sequence header, such that a sequence parameter set (SPS) corresponding to the header information arrives at the decoder earlier than data referred to by the parameter set. As a result, the sequence parameter set RBSP acts as header information of a compressed data of moving images at entry S1 (FIG. 2). If the bitstream is received, the profile ID information "profile_idc" identifies which one of profiles from among several profiles corresponds to the received bitstream.

The profile ID information "profile_idc" can be set, for example, to "MULTI_VIEW_PROFILE)", so that the syntax including the profile ID information can determine whether the received bitstream relates to a multiview profile. The following configuration information can be added when the received bitstream relates to the multiview profile.

Figure 1:
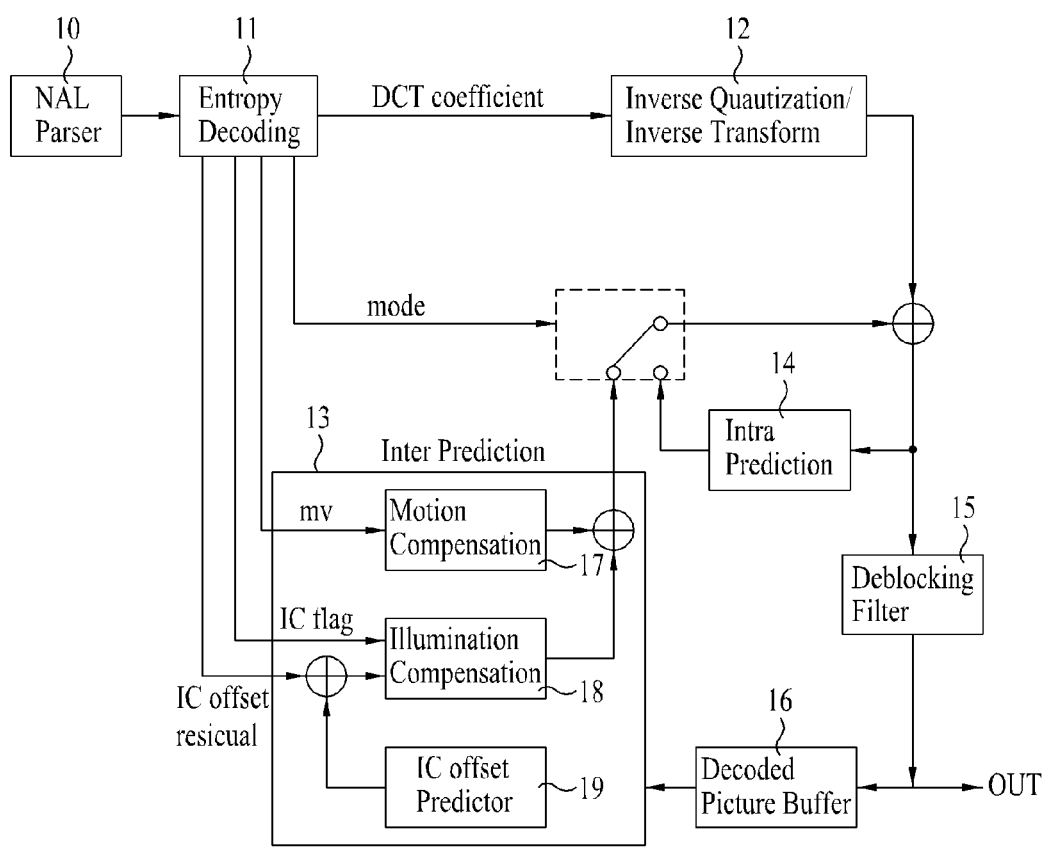
FIG. 1 is an exemplary decoding apparatus.

FIG. 1 is a block diagram illustrating an exemplary decoding apparatus (or "decoder") of a multiview video system for decoding a video signal containing a multiview video sequence. The multiview video system includes a corresponding encoding apparatus (or "encoder") to provide the multiview video sequence as a bitstream that includes encoded image data embodied on a machine-readable information carrier (e.g., a machine-readable storage medium, or a machine-readable energy signal propagating between a transmitter and receiver.).

Referring to FIG. 1, the decoding apparatus includes a parsing unit 10, an entropy decoding unit 11, an Inverse Quantization/Inverse Transform unit 12, an inter-prediction unit 13, an intra-prediction unit 14, a deblocking filter 15, and a decoded-picture buffer 16.

The inter-prediction unit 13 includes a motion compensation unit 17, an illumination compensation unit 18, and an illumination-compensation offset prediction unit 19.

The parsing unit 10 performs a parsing of the received video sequence in NAL units to decode the received video sequence. Typically, one or more sequence parameter sets and picture parameter sets are transmitted to a decoder before a slice header and slice data are decoded. In this case, the NAL header or an extended area of the NAL header may include a variety of configuration information, for example, temporal level information, view level information, anchor picture ID information, and view ID information, etc.

The term "time level information" is indicative of hierarchical-structure information for providing temporal scalability from a video signal, such that sequences of a variety of time zones can be provided to a user via the above-mentioned temporal level information.

The term "view level information" is indicative of hierarchical-structure information for providing view scalability from the video signal. The multiview video sequence can define the temporal level and view level, such that a variety of temporal sequences and view sequences can be provided to the user according to the defined temporal level and view level.

In this way, if the level information is defined as described above, the user may employ the temporal scalability and the view scalability. Therefore, the user can view a sequence corresponding to a desired time and view, or can view a sequence corresponding to another limitation. The above-mentioned level information may also be established in various ways according to reference conditions. For example, the level information may be changed according to a camera location, and may also be changed according to a camera arrangement type. In addition, the level information may also be arbitrarily established without a special reference.

The term "anchor picture" is indicative of an encoded picture in which all slices refer to only slices in a current view and not slices in other views. A random access between views can be used for multiview-sequence decoding.

Anchor picture ID information can be used to perform the random access process to access data of a specific view without requiring a large amount of data to be decoded.

The term "view ID information" is indicative of specific information for discriminating between a picture of a current view and a picture of another view. In order to discriminate one picture from other pictures when the video sequence signal is encoded, a Picture Order Count (POC) and frame number information (frame_num) can be used.

If a current sequence is determined to be a multiview video sequence, inter-view prediction can be performed. An identifier is used to discriminate a picture of the current view from a picture of another view.

A view identifier can be defined to indicate a picture's view. The decoding apparatus can obtain information of a picture in a view different from a view of the current picture using the above-mentioned view identifier, such that it can decode the video signal using the information of the picture. The above-mentioned view identifier can be applied to the overall encoding/decoding process of the video signal. Also, the above-mentioned view identifier can also be applied to the multiview video coding process using the frame number information "frame_num" considering a view.

Typically, the multiview sequence has a large amount of data, and a hierarchical encoding function of each view (also called a "view scalability") can be used for processing the large amount of data. In order to perform the view scalability function, a prediction structure considering views of the multiview sequence may be defined.

The above-mentioned prediction structure may be defined by structuralizing the prediction order or direction of several view sequences. For example, if several view sequences to be encoded are given, a center location of the overall arrangement is set to a base view, such that view sequences to be encoded can be hierarchically selected. The end of the overall arrangement or other parts may be set to the base view.

If the number of camera views is denoted by an exponential power of "2", a hierarchical prediction structure between several view sequences may be formed on the basis of the above-mentioned case of the camera views denoted by the exponential power of "2". Otherwise, if the number of camera views is not denoted by the exponential power of "2", virtual views can be used, and the prediction structure may be formed on the basis of the virtual views. If the camera arrangement is indicative of a two-dimensional arrangement, the prediction order may be established by turns in a horizontal or vertical direction.

A parsed bitstream is entropy-decoded by an entropy decoding unit 11, and data such as a coefficient of each macroblock, a motion vector, etc., are extracted. The inverse quantization/inverse transform unit 12 multiplies a received quantization value by a predetermined constant to acquire a transformed coefficient value, and performs an inverse transform of the acquired coefficient value, such that it reconstructs a pixel value. The inter-prediction unit 13 performs an inter-prediction function from decoded samples of the current picture using the reconstructed pixel value.

At the same time, the deblocking filter 15 is applied to each decoded macroblock to reduce the degree of block distortion. The deblocking filter 15 performs a smoothing of the block edge, such that it improves an image quality of the decoded frame. The selection of a filtering process is dependent on a boundary strength and a gradient of image samples arranged in the vicinity of the boundary. The filtered pictures are stored in the decoded picture buffer 16, such that they can be outputted or be used as reference pictures.

The decoded picture buffer 16 stores or outputs pre-coded pictures to perform the inter-prediction function. In this case, frame number information "frame_num" and POC (Picture Order Count) information of the pictures are used to store or output the pre-coded pictures. Pictures of other view may exist in the above-mentioned pre-coded pictures in the case of the MVC technology. Therefore, in order to use the above-mentioned pictures as reference pictures, not only the "frame_num" and POC information, but also view identifier indicating a picture view may be used as necessary.

The inter-prediction unit 13 performs the inter-prediction using the reference pictures stored in the decoded picture buffer 16. The inter-coded macroblock may be divided into macroblock partitions. Each macroblock partition can be predicted by one or two reference pictures.

The motion compensation unit 17 compensates for a motion of the current block using the information received from the entropy decoding unit 11. The motion compensation unit 17 extracts motion vectors of neighboring blocks of the current block from the video signal, and obtains a motion-vector predictor of the current block. The motion compensation unit 17 compensates for the motion of the current block using a difference value between the motion vector and a predictor extracted from the video signal and the obtained motion-vector predictor. The above-mentioned motion compensation may be performed by only one reference picture, or may also be performed by a plurality of reference pictures.

Therefore, if the above-mentioned reference pictures are determined to be pictures of other views different from the current view, the motion compensation may be performed according to a view identifier indicating the other views.

A direct mode is indicative of a coding mode for predicting motion information of the current block on the basis of the motion information of a block which is completely decoded. The above-mentioned direct mode can reduce the number of bits required for encoding the motion information, resulting in the increased compression efficiency.

For example, a temporal direct mode predicts motion information of the current block using a correlation of motion information of a temporal direction. Similar to the temporal direct mode, the decoder can predict the motion information of the current block using a correlation of motion information of a view direction.

If the received bitstream corresponds to a multiview sequence, view sequences may be captured by different cameras respectively, such that a difference in illumination may occur due to internal or external factors of the cameras. In order to reduce potential inefficiency associated with the difference in illumination, an illumination compensation unit 18 performs an illumination compensation function.

In the case of performing illumination compensation function, flag information may be used to indicate whether an illumination compensation at a specific level of a video signal is performed. For example, the illumination compensation unit 18 may perform the illumination compensation function using flag information indicating whether the illumination compensation of a corresponding slice or macroblock is performed. Also, the abovementioned method for performing the illumination compensation using the above-mentioned flag information may be applied to a variety of macroblock types (e.g., an inter 16×16 mode, a B-skip mode, a direct mode, etc.).

In order to reconstruct the current block when performing the illumination compensation, information of a neighboring block or information of a block in views different from a view of the current block may be used, and an offset value of the current block may also be used.

In this case, the offset value of the current block is indicative of a difference value between an average pixel value of the current block and an average pixel value of a reference block corresponding to the current block. As an example for using the above-mentioned offset value, a predictor of the current-block offset value may be obtained by using the neighboring blocks of the current block, and a residual value between the offset value and the predictor may be used. Therefore, the decoder can reconstruct the offset value of the current block using the residual value and the predictor.

In order to obtain the predictor of the current block, information of the neighboring blocks may be used as necessary.

For example, the offset value of the current block can be predicted by using the offset value of a neighboring block. Prior to predicting the current-block offset value, it is determined whether the reference index of the current block is equal to a reference index of the neighboring blocks. According to the determined result, the illumination compensation unit 18 can determine which one of neighboring blocks will be used or which value will be used.

The illumination compensation unit 18 may perform the illumination compensation using a prediction type of the current block. If the current block is predictively encoded by two reference blocks, the illumination compensation unit 18 may obtain an offset value corresponding to each reference block using the offset value of the current block.

As described above, the inter-predicted pictures or intra-predicted pictures acquired by the illumination compensation and motion compensation are selected according to a prediction mode, and reconstructs the current picture.

A variety of examples of encoding/decoding methods for reconstructing a current picture are described later in this document. FIG. 2 is a structural diagram illustrating a sequence parameter set RBSP syntax.

Referring to FIG. 2, a sequence parameter set is indicative of header information including information (e.g., a profile, and a level) associated with the entire-sequence encoding.

The entire compressed sequence can begin at a sequence header, such that a sequence parameter set corresponding to the header information arrives at the decoder earlier than data referring to the parameter set. As a result, the sequence parameter set (RBSP) acts as header information associated with resultant data of compressed moving images at step S1.

If the bitstream is received, "profile_idc" information determines which one of profiles from among several profiles corresponds to the received bitstream at step S2. For example, if "profile_idc" is set to "66", this indicates the received bitstream is based on a baseline profile. If "profile_idc" is set to "77", this indicates the received bitstream is based on a main profile. If "profile_idc" is set to "88", this indicates the received bitstream is based on an extended profile. A step S3 uses the syntax "If (profile_idc)==MULTI_VIEW_PROFILE)" to determine whether the received bitstream relates to a multiview profile.

If the received bitstream relates to the multiview profile at step S3, a variety of information of the multiview sequence can be added to the received bitstream.

The "reference_view" information represents a reference view of an entire view, and may add information associated with the reference view to the bitstream. Generally, the MVC technique encodes or decodes a reference view sequence using an encoding scheme capable of being used for a single sequence (e.g., the H.264/AVC codec). If the reference view is added to the syntax, the syntax indicates which one of views from among several views will be set to the reference view.

A base view acting as an encoding reference acts as the above-mentioned reference view. Images of the reference-view are independently encoded without referring to an image of another-view.

The number of views (num_views) may add specific information indicating the number of multiview captured by several cameras. The view number (num_views) of each sequence may be set in various ways. The "num_views" information is transmitted to an encoder and a decoder, such that the encoder and the decoder can freely use the "num_views" information at step S5.

Camera arrangement (view_arrangement) indicates an arrangement type of cameras when a sequence is acquired. If the "view_arrangement" information is added to the syntax, the encoding process can be effectively performed to be appropriate for individual arrangements. Thereafter, if a new encoding method is developed, different "view_arrangement" information can be used.

The number of frames "temporal_units_size" indicates the number of successively encoded/decoded frames of each view. If required, specific information indicating the number of frames may also be added. In more detail, provided that a current N-th view is being encoded/decoded, and a M-th view will be encoded/decoded at the next time, the "temporal_units_size" information indicates how many frames will be firstly processed at the N-th view and the M-th view will be then processed. By the "temporal_units_size" information and the "num_views" information, the system can determine which one of views from among several views corresponds to each frame. If a first length from the I slice to the P slice of each view sequence, a second length between the P slices, or the length corresponding to a multiple of the first or second length is set to the "temporal_units_size" information, the "temporal_units_size" information may be processed at only one view, and may go to the next view. The "temporal_units_size" information may be equal to or less than the conventional GOP length. For example, FIGS. 4B~4C show the GGOP structure for explaining the "temporal_units_size" concept. In this case, in FIG. 4B, the "temporal_units_size" information is set to "3". In FIG. 4C, the "temporal_units_size" information is set to "1".

In some examples, the MVC method arranges several frames on a time axis and a view axis, such that it may process a single frame of each view at the same time value, and may then process a single frame of each view at the next time value, corresponding to a "temporal_units_size" of "1". Alternatively, the MVC method may process N frames at the same view, and may then process the N frames at the next view, corresponding to a "temporal_units_size" of "N". Since generally at least one frame is processed, "temporal_units_size_minus1" may be added to the syntax to represent how many additional frames are processed. Thus, the above-mentioned examples may be denoted by "temporal_units_size_minus1=0" and "temporal_units_size_minus1=N−1", respectively, at step S7.

The profiles of the conventional encoding scheme have no common profile, such that a flag is further used to indicate compatibility. "constraint_set*_flag" information indicates which one of profiles can decode the bitstream using a decoder. "constraint_set0_flag" information indicates that the bitstream can be decoded by a decoder of the baseline profile at step S8. "constraint_set1_flag" information indicates that the bitstream can be decoded by a decoder of the main profile at step S9. "constraint_set2_flag" information indicates that the bitstream can be decoded by a decoder of the extended profile at step S10. Therefore, there is need to define the "MULTI_VIEW_PROFILE" decoder, and the "MULTI_VIEW_PROFILE" decoder may be defined by "constraint_set4_flag" information at step S11.

The "level_idc" information indicates a level identifier. The "level" generally indicates the capability of the decoder and the complexity of bitstream, and relates to technical elements prescribed in the above-mentioned profiles at step S12.

The "seq_parameter_set_id" information indicates SPS (Sequence Parameter Set) ID information contained in the SPS (sequence parameter set) in order to identify sequence types at step S13.

FIG. 3A is a structural diagram illustrating a bitstream including only one sequence.

Referring to FIG. 3A, the sequence parameter set (SPS) is indicative of header information including information (e.g., a profile, and a level) associated with the entire-sequence encoding. The supplemental enhancement information (SEI) is indicative of supplementary information, which is not required for the decoding process of a moving-image (i.e., sequence) encoding layer. The picture parameter set (PPS) is header information indicating an encoding mode of the entire picture. The I slice performs only an intra coding process. The P slice performs the intra coding process or the inter prediction coding process. The picture delimiter indicates a boundary between video pictures. The system applies the SPS RBSP syntax to the above-mentioned SPS. Therefore, the system employs the above-mentioned syntax during the generation of the bitstream, such that it can add a variety of information to a desired object.

Figure 3B:
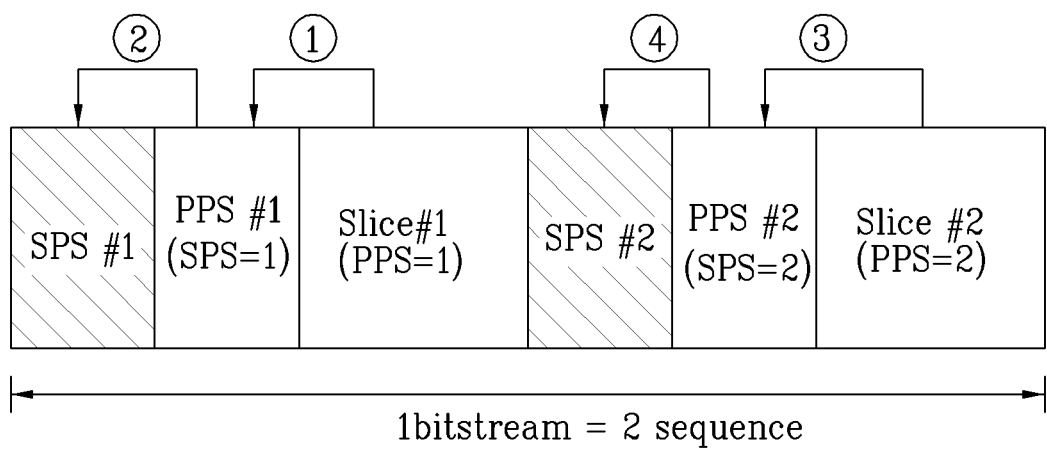
FIG. 3B is a structural diagram illustrating a bitstream including two sequences.

FIG. 3B is a structural diagram illustrating a bitstream including two sequences.

Referring to FIG. 3B, the H.264/AVC technology can handle a variety of sequences using a single bitstream. The SPS includes SPS ID information (seq_parameter_set_id) in the SPS so as to identify a sequence. The SPS ID information is prescribed in the PPS (Picture Parameter Set), such that which one of sequences includes the picture. Also, the PPS ID information (pic_parameter_set_id) is prescribed in the slice header, such that the "pic_parameter_set_id" information can identify which one of PPSs will be used.

For example, a header of the slice #1 of FIG. 3B includes PPS ID information (pic_parameter_set_id) to be referred, as denoted by ①. The PPS#1 includes the referred SPS ID information (SPS=1), as denoted by ②. Therefore, it can be recognized that the slice #1 belongs to the sequence #1. In this way, it can also be recognized the slice #2 belongs to the sequence #2, as denoted by ③ and ④. Indeed, the baseline profile and the main profile are added and edited to create a new video bitstream. In this case, two bitstreams are assigned different SPS ID information. Any one of the two bitstreams may also be converted into a multiview profile as necessary.

Figure 4A:
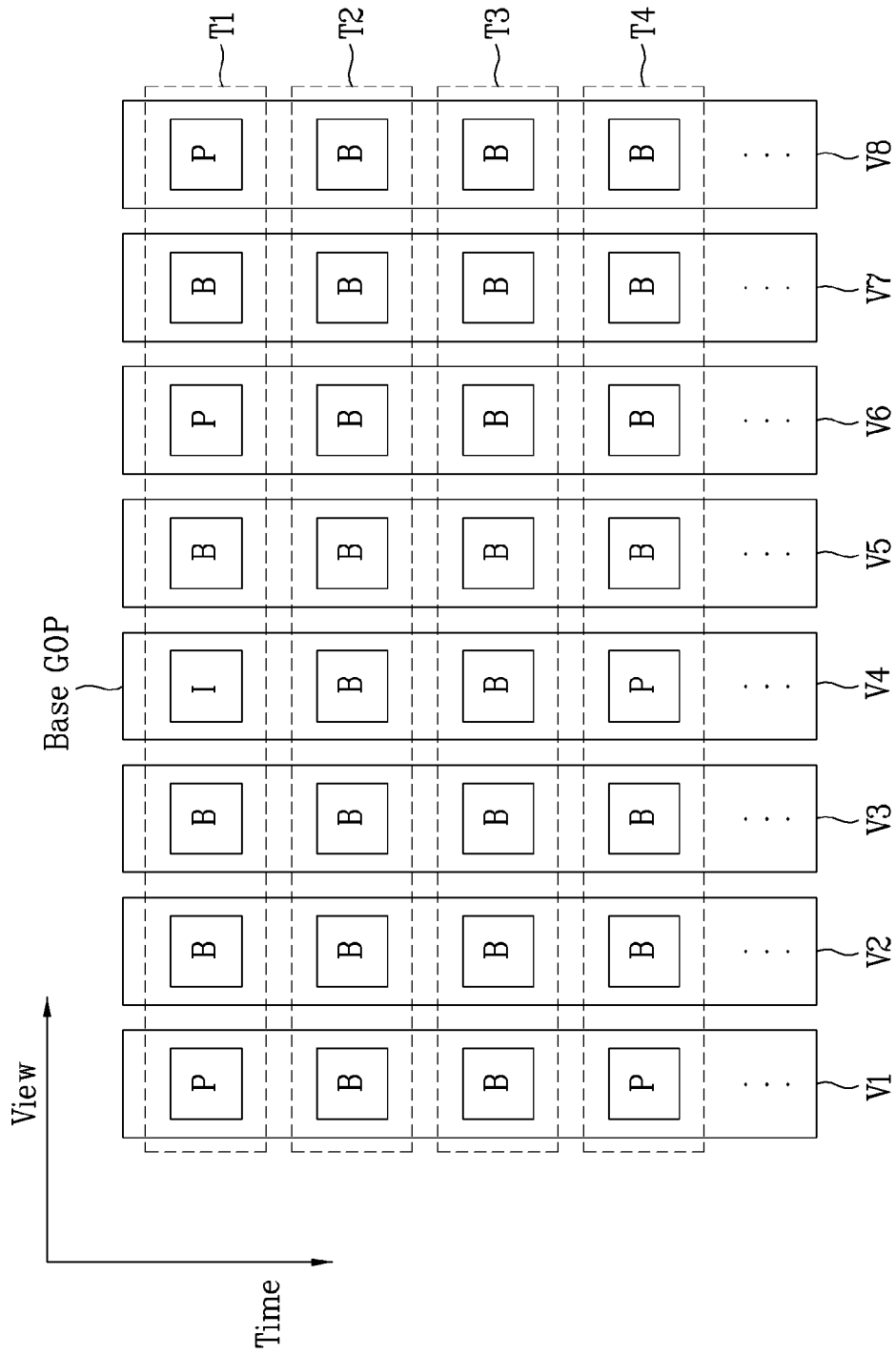
FIGS. 4A-4C are diagrams illustrating exemplary Group Of GOP (GGOP) structures.
Figure 4B:
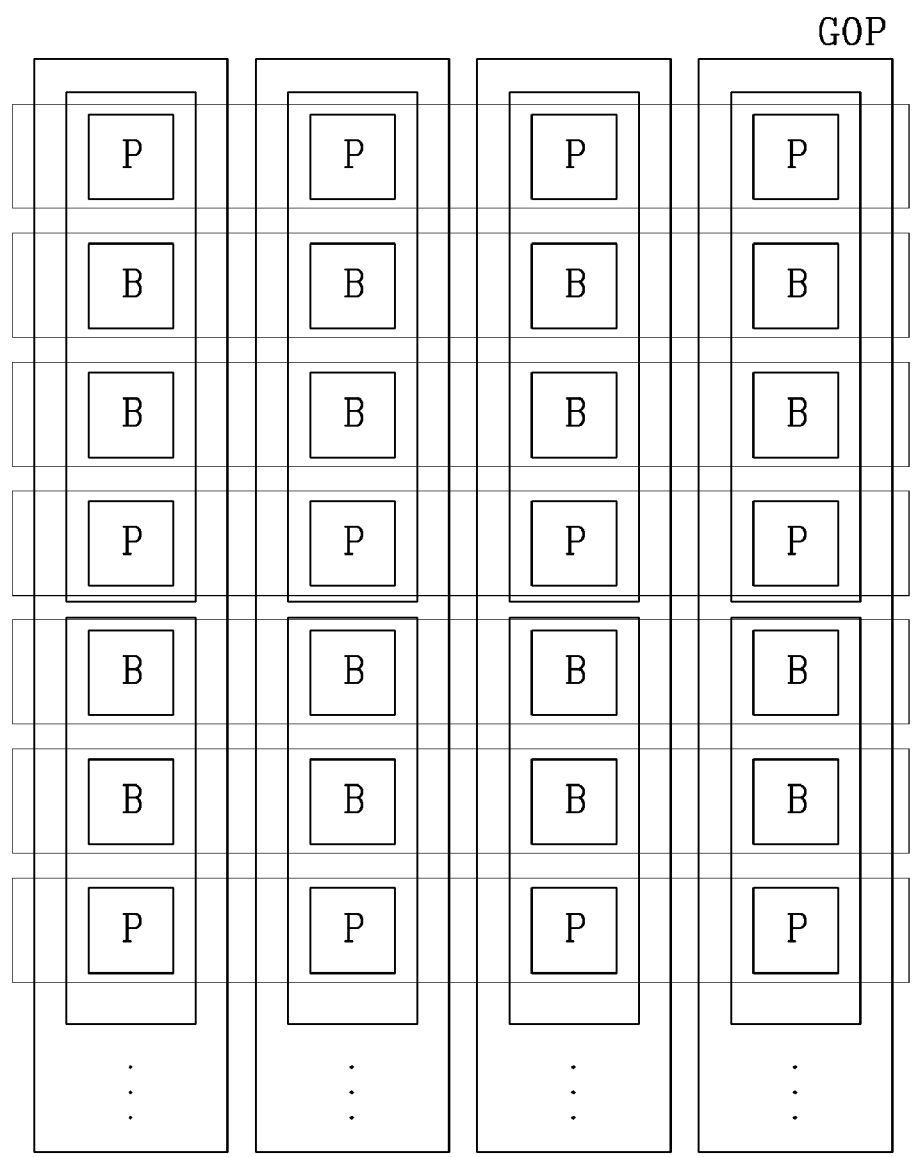
Figure 4C:
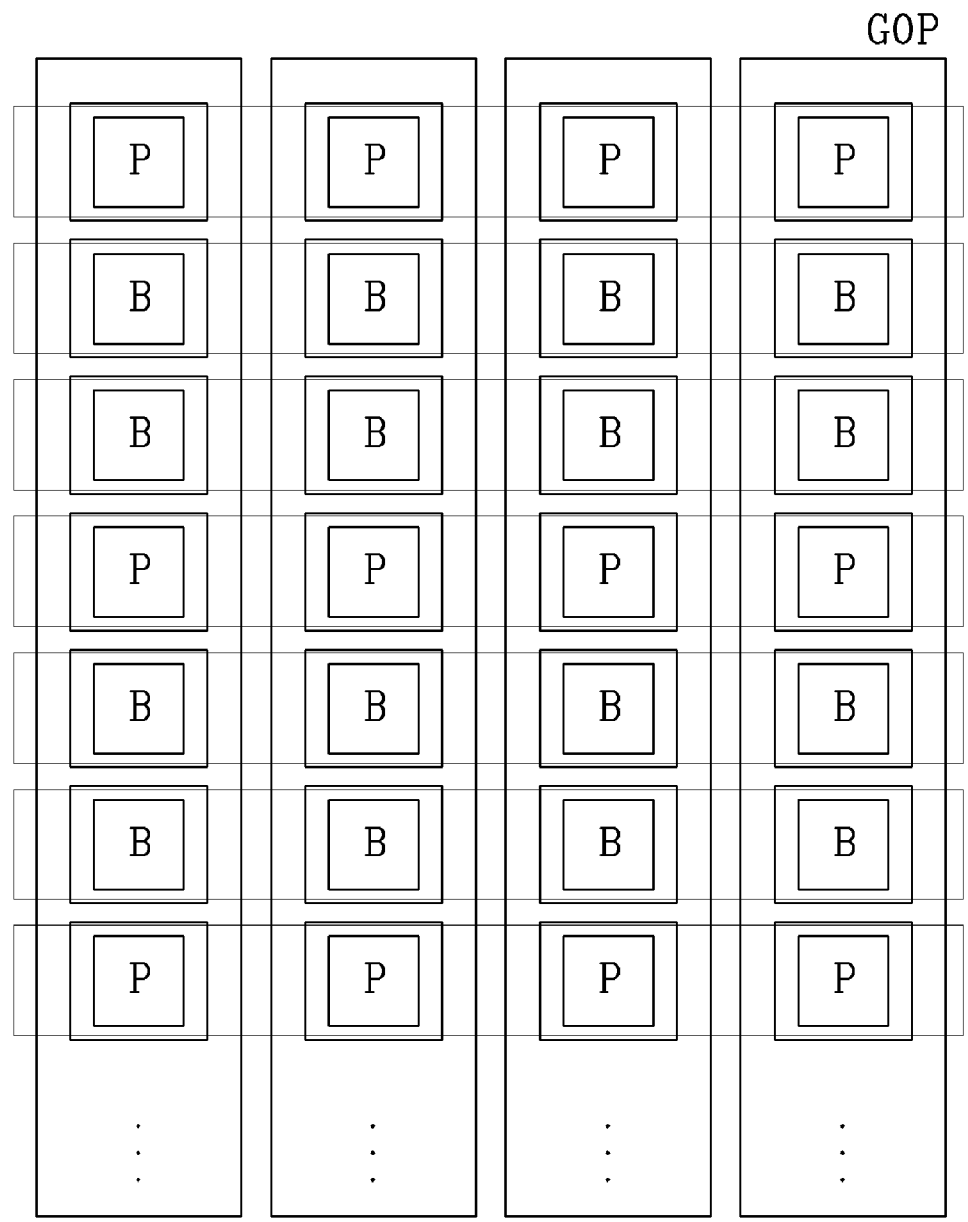

FIG. 4A shows an exemplary Group Of GOP (GGOP) structure. FIG. 4B and FIG. 4C shows a GGOP structure for explaining a "temporal_units_size" concept. The GOP is indicative of a data group of some pictures. In order to effectively perform the encoding process, the MVC uses the GGOP concept to perform spatial prediction and temporal prediction.

If a first length between the I slice and the P slide of each view-sequence, a second length between the P slices, or a third length corresponding to a multiple of the first or second length is set to the "temporal_units_size" information, the "temporal_units_size" information may be processed at only one view, and may go to the next view. The "temporal_units_size" information may be equal to or less than the conventional GOP length. For example, in FIG. 4B, the "temporal_units_size" information is set to "3". In FIG. 4C, the "temporal_units_size" information is set to "1". Specifically, in FIG. 4B, if the "temporal_units_size" information is denoted by "temporal_units_size>1", and one or more views begin at the I frame, (temporal_units_size+1) frames can be processed. Also, the system can recognize which one of views from among several views corresponds to each frame of the entire sequence by referring to the above-mentioned "temporal_units_size" and "num_views" information.

In FIG. 4A, individual frames are arranged on a time axis and a view axis. Pictures of V1~V8 indicate a GOP respectively. The V4 acting as a base GOP is used as a reference GOP of other GOPs. If the "temporal_units_size" information is set to "1", the MVC method processes frames of individual views at the same time zone, and then can re-process the frames of the individual views at the next time zone. Picture of T1~T4 indicate frames of individual views at the same time zone. In other words, the MVC method can firstly process the T1 frames, and then can process a plurality of frames in the order of T4→T2→T3→ . . . . If the "temporal_units_size" information is set to "N", the MVC method may firstly process N frames in the direction of the time axis within a single view, and may process the N frames at the next view. In other words, if the "temporal_units_size" information is set to "4", the MVC method may firstly process frames contained in the T1~T4 frames of the V4 GOP, and then may process a plurality of frames in the order of V1→V2→V3→ . . . .

Therefore, in the case of generating the bitstream in FIG. 4A, the number of views (num_views) is set to "8", the reference view is set to the V4 GOP (Group Of Pictures) The number of frames (temporal_units_size) indicates the number of successively encoded/decoded frames of each view. Therefore, if the frames of each view are processed at the same time zone in FIG. 4A, the "temporal_unit_size" information is set to "1". If the frames are processed in the direction of the time axis within a single view, the "temporal_unit_size" information is set to "N". The above-mentioned information is added to the bitstream generating process.

Figure 5:
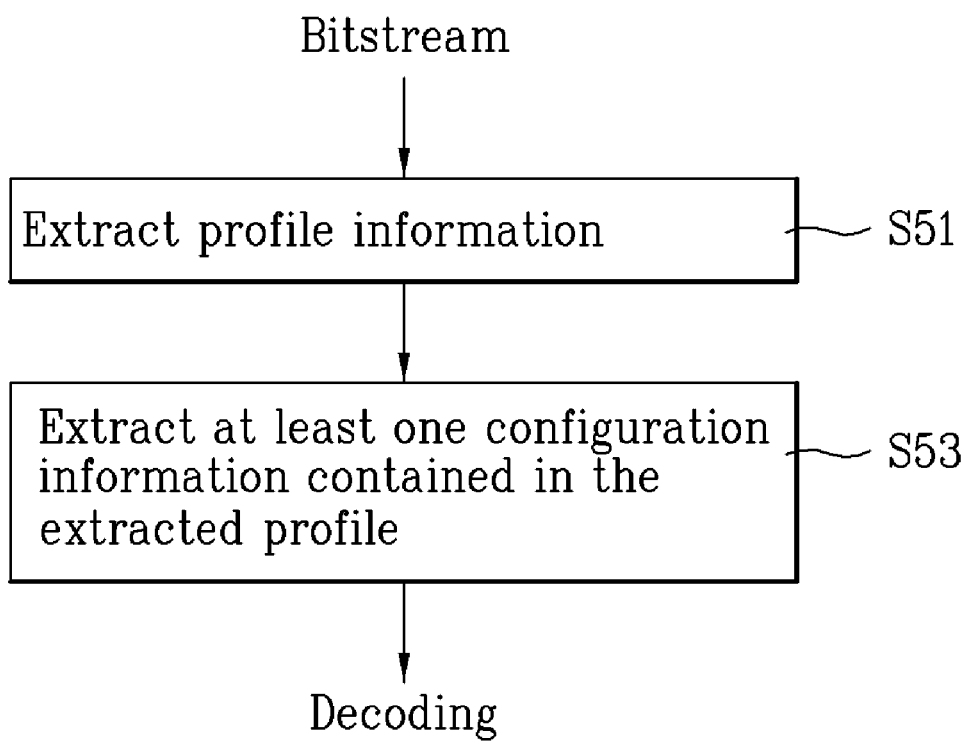
FIG. 5 is a flowchart illustrating a method for decoding a video sequence.

FIG. 5 is a flow chart illustrating a method for decoding a video sequence.

Figure 8:
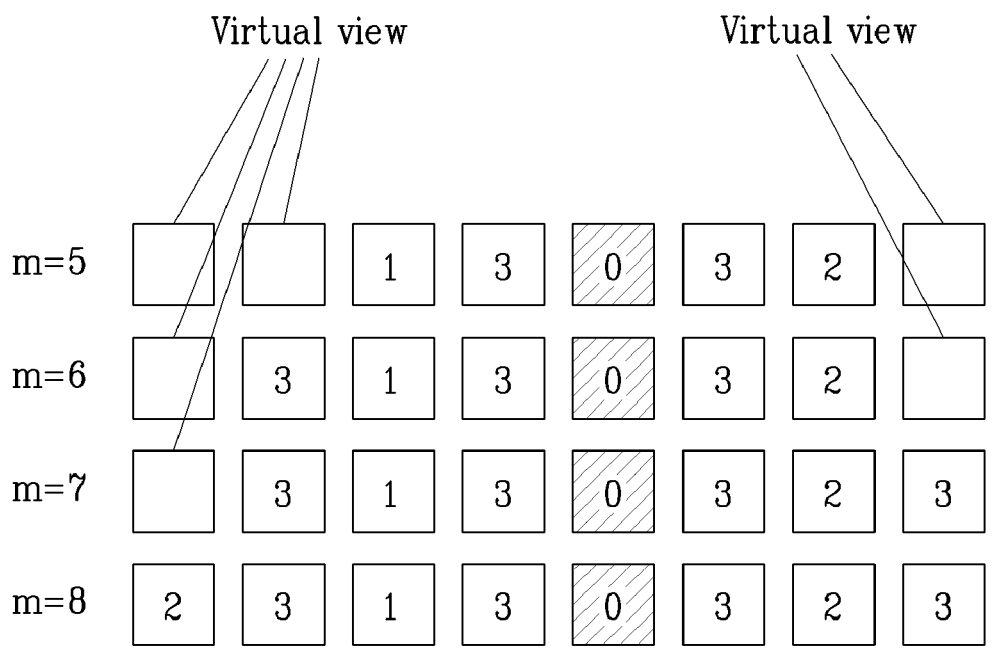

Referring to FIG. 8, one or more profile information is extracted from the received bitstream. In this case, the extracted profile information may be at least one of several profiles (e.g., the baseline profile, the main profile, and the multiview profile). The above-mentioned profile information may be changed according to input video sequences at step S51. At least one configuration information contained in the above-mentioned profile is extracted from the extracted profile information. For example, if the extracted profile information relates to the multiview profile, one or more configuration information (i.e., "reference_view", "num_views", "view_arrangement", and "temporal_units_size" information) contained in the multiview profile is extracted at step S53. In this way, the above-mentioned extracted information is used for decoding the multiview-coded bitstream.

Figure 6A:
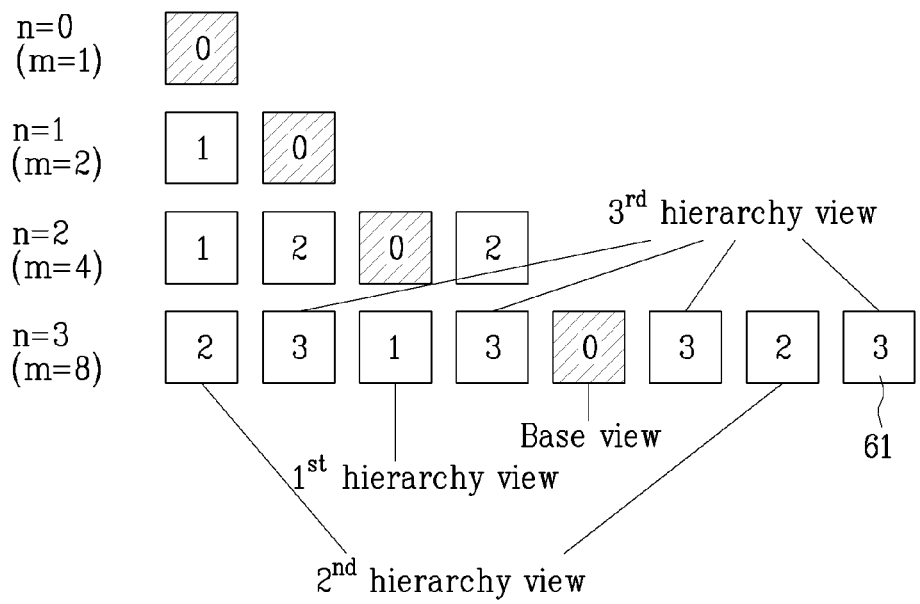
Figure 6B:
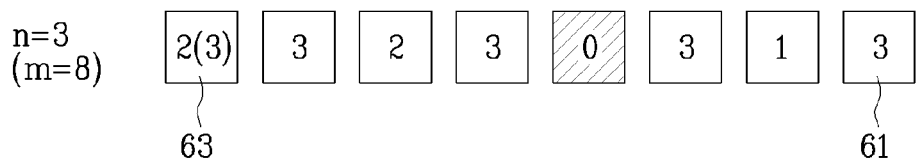

FIGS. 6A-6B are conceptual diagrams illustrating a multiview-sequence prediction structure according to a first example.

Referring to FIGS. 6A-6B, provided that the number (m) of several viewpoints (i.e., multiview number) is set to $2^n$ (i.e., $m=2^n$), if n=0, the multiview number (m) is set to "1". If n=1, the multiview number (m) is set to "2". If n=2, the multiview number (m) is set to "4". If n=3, the multiview number (m) is set to "8". Therefore, if the multiview number (m) is set to $2^{n-1} < m \leq 2^n$, the bitstream includes a single base-view bitstream and n hierarchical auxiliary-view bitstreams.

Specifically, the term "base view" is indicative of a reference view from among several viewpoints (i.e., the multiview). In other words, a sequence (i.e., moving images) corresponding to the base view is encoded by general video encoding schemes (e.g., MPEG-2, MPEG-4, H.263, and H.264, etc.), such that it is generated in the form of an independent bitstream. For the convenience of description, this independent bitstream is referred to as a "base-view bitstream".

The term "auxiliary view" is indicative of the remaining view other than the above-mentioned base view from among several viewpoints (i.e., the multiview). In other words, the sequence corresponding to the auxiliary view forms a bitstream by performing disparity estimation of the base-view sequence, and this bitstream is referred to as "auxiliary-view bitstream".

In the case of performing a hierarchical encoding process (i.e., a view scalability process) between several viewpoints (i.e., the multiview), the above-mentioned auxiliary-view bitstream is classified into a first auxiliary-view bitstream, a second auxiliary-view bitstream, and a n-th auxiliary-view bitstream.

The term "bitstream" may include the above-mentioned base-view bitstream and the above-mentioned auxiliary-view bitstream as necessary.

For example, if the multiview number (m) is set to "8" (n=3), the bitstream includes a single base-view and three hierarchical auxiliary-views. If the bitstream includes the single base-view and n hierarchical auxiliary-views, it is preferable that a location to be the base-view from among the multiview and a location to be each hierarchical auxiliary-view are defined by general rules. For reference, square areas of FIGS. 6A-6B indicate individual viewpoints. As for numerals contained in the square areas, the number "0" is indicative of a base-view, the number "1" is indicative of a first hierarchical auxiliary-view, the number "2" is indicative of a second hierarchical auxiliary-view, and the number "3" is indicative of a third hierarchical auxiliary-view. In this example of FIGS. 6A-6B, a maximum of 8 viewpoints are exemplarily disclosed as the multiview video sequence, however, it should be noted that the multiview number is not limited to "8" and any multiview number is applicable to other examples as necessary.

Referring to FIG. 6A, respective base-views and respective auxiliary-views are determined by the following rules. Firstly, the location of the base-view is set to a $2^{n-1}$-th view. For example, if n=3, the base-view is set to a fourth view.

FIGS. 6A-6B shows an exemplary case in which the beginning view is located at the rightmost side. A specific view corresponding to a fourth order from the rightmost view 61 is used as the base-view. Preferably, the base-view location may be located at a specific location in the vicinity of a center view from among the multiview or may be set to the center view from among the multiview, because the base-view may be used as a reference for performing the predictive coding (or predictive encoding) process of other auxiliary-views.

For another example, the leftmost view is always set to the beginning view, and the number (m) of viewpoints (i.e., the multiview number) may be arranged in the order of m=0→m=1→m=2→m=3, . . . . For example, if n=3, the $2^{n-1}$-th multiview number (i.e., m=4) may be set to the base-view.

The first hierarchical auxiliary-view location may be set to a left-side view spaced apart from the abovementioned base-view by a $2^{n-2}$-th magnitude, or a right-side view spaced apart from the above-mentioned base-view by the $2^{n-2}$-th magnitude. For example, FIG. 6A shows an exemplary case in which a viewpoint spaced apart from the base view in the left direction by the $2^{n-2}$-th view (i.e., two viewpoints is case of n=3) is determined to be the first hierarchical auxiliary-view. Otherwise, FIG. 6B shows an exemplary case in which a viewpoint spaced apart from the base view in the right direction by the $2^{n-2}$-th view is determined to be the first hierarchical auxiliary-view. In the above-mentioned example, the number of the first hierarchical auxiliary-view is set to "1".

The second hierarchical auxiliary-view location may be set to left-side view spaced apart from the base-view by a $2^{n-2}$-th magnitude, or a right-side view spaced apart from the first hierarchical auxiliary-view by the $2^{n-2}$-th magnitude. For example, the above-mentioned case of FIG. 6A generates two second hierarchical auxiliary-views. Since the above-mentioned case of FIG. 6B has no view spaced apart from the first hierarchical auxiliary-view in the right direction by $2^{n-2}$-th magnitude, a viewpoint spaced apart from the base-view in the left direction by the $2^{n-2}$-th magnitude is determined to be the second hierarchical auxiliary-view.

A viewpoint spaced apart from the second hierarchical auxiliary-view in the left direction by the $2^{n-2}$-th magnitude may also be determined to be the second hierarchical auxiliary-view 63. However, if the viewpoint corresponds to both ends of the multiview, the abovementioned viewpoint may be determined to the third hierarchical auxiliary-view. One or two second hierarchical auxiliary-views may be generated in the case of FIG. 6B.

Finally, the third hierarchical auxiliary-view location is set to the remaining viewpoints other than the above-mentioned viewpoints having been selected as the base-view and the first and second hierarchical auxiliary-views. In FIG. 6A, four third hierarchical auxiliary-views are generated. In FIG. 6B, four or five third hierarchical auxiliary-views are generated.

Figure 7A:
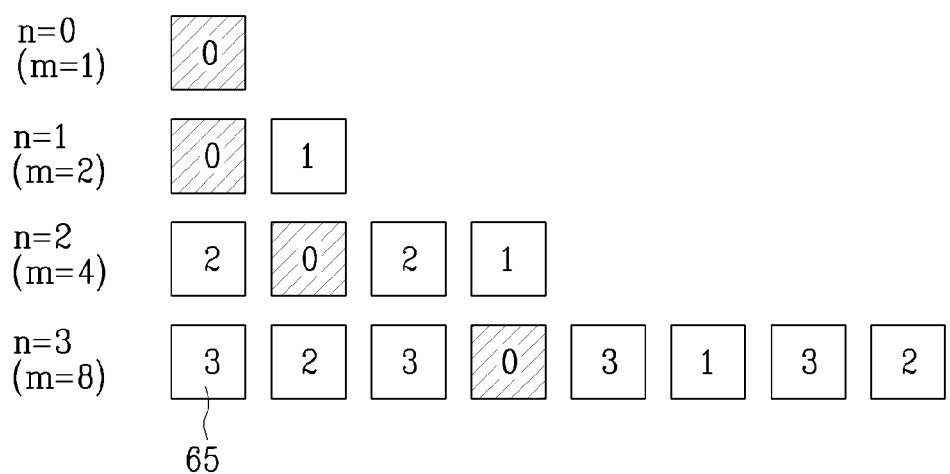
Figure 7B:
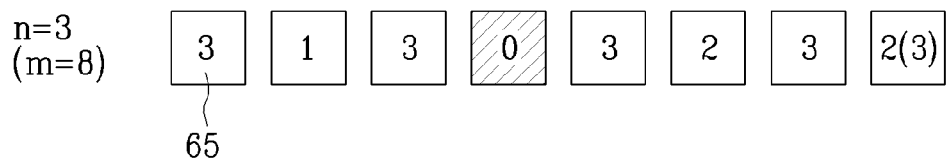

FIGS. 7A-7B are conceptual diagrams illustrating a multiview-sequence prediction structure according to a second example.

The second example of FIGS. 7A-7B is conceptually similar to the above-mentioned first example of FIGS. 6A-6B, however, it should be noted that FIGS. 7A-7B show that the beginning-view for selecting the base-view is located at the leftmost side, differently from FIGS. 6A-6B. In other words, a fourth view spaced apart from the leftmost side 65 is selected as the base-view. In FIGS. 7A-7B, the remaining parts other than the above-mentioned difference are the same as those of FIGS. 6A-6B.

FIG. 8 is a conceptual diagram illustrating a multiview-sequence prediction structure according to a third example.

The third example of FIG. 8 shows an exemplary case in which the multiview number (m) is set to $2^{n-1}<m \leq 2^n$. In more detail, FIG. 8 shows a variety of cases denoted by m=5, m=6, m=7, and m=8. If m=5, 6, and 7, the multiview number (m) does not satisfy the condition of m=$2^n$, such that the system has difficulty in implementing the abovementioned first example of FIGS. 6A-6B and the abovementioned second example of FIGS. 7A-7B without any change. In order to solve the above-mentioned problem, the system applies a virtual-view concept, such that the abovementioned problem is obviated by the virtual-view concept.

For example, if $2^{n-1}<m<2^n$, $2^n-m$ virtual-views are generated. If the multiview number (m) is an odd number, $(2^n-m+1)/2$ virtual-views are generated at the left side (or the right side) of the multiview arrangement, and $(2^n-m-1)/2$ virtual-views are generated at the right side (or the left side) of the multiview arrangement. If the multiview number (m) is an even number, $(2^n-m)/2$ virtual-views are generated at the left side and the right side of the multiview arrangement, respectively. And then, the abovementioned prediction structure can be applied with the resultant virtual views in the same manner.

For example, if the multiview number (m) is set to "5", the multiview of m=8 is virtually formed by adding one or two virtual-views to both ends of the multiview, respectively, and the base-view location and three hierarchical auxiliary-view locations are selected. As can be seen from FIG. 8, two virtual-views are added to the end of the left side, and a single virtual-view is added to the end of the right side, such that the base-view and the first to third hierarchical auxiliary-views are selected according to the above-mentioned example of FIG. 6A.

For example, if the multiview number (m) is set to "6", the multiview of m=8 is virtually formed by adding a single virtual-view to both ends of the multiview, and the base-view location and three hierarchical auxiliary-view locations are selected, respectively. As can be seen from FIG. 8, the base-view and the first to third hierarchical auxiliary-views are selected according to the abovementioned example of FIG. 6A.

For example, if the multiview number (m) is set to "7", the multiview of m=8 is virtually formed by adding a single virtual-view to any one of both ends of the multiview, and the base-view location and three hierarchical auxiliary-view locations are selected, respectively. For example, as shown in FIG. 8, a single virtual-view is added to the end of the left side, such that the base-view and the first to third hierarchical auxiliary-views are selected according to the abovementioned example of FIG. 6A.

Figure 9A:
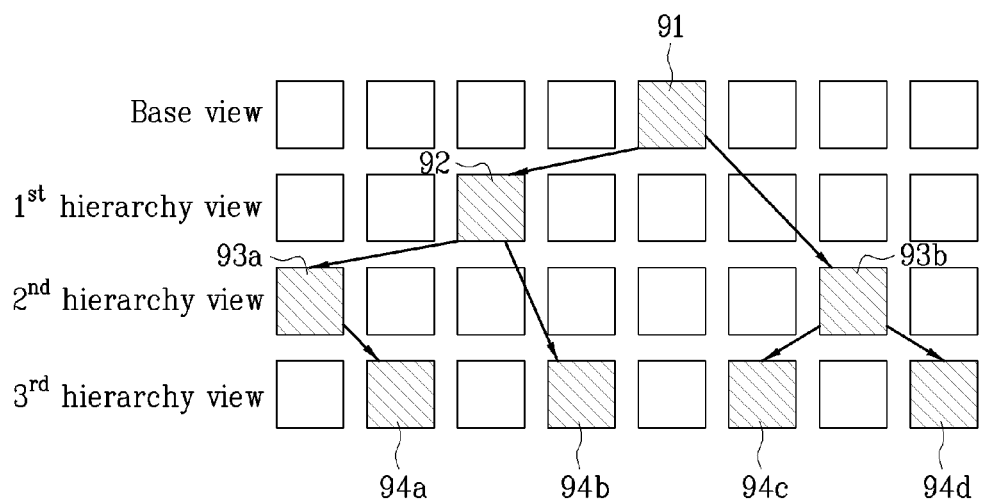
FIGS. 9A-9B are diagrams illustrating a hierarchical prediction structure between several viewpoints of multiview sequence data.
Figure 9B:
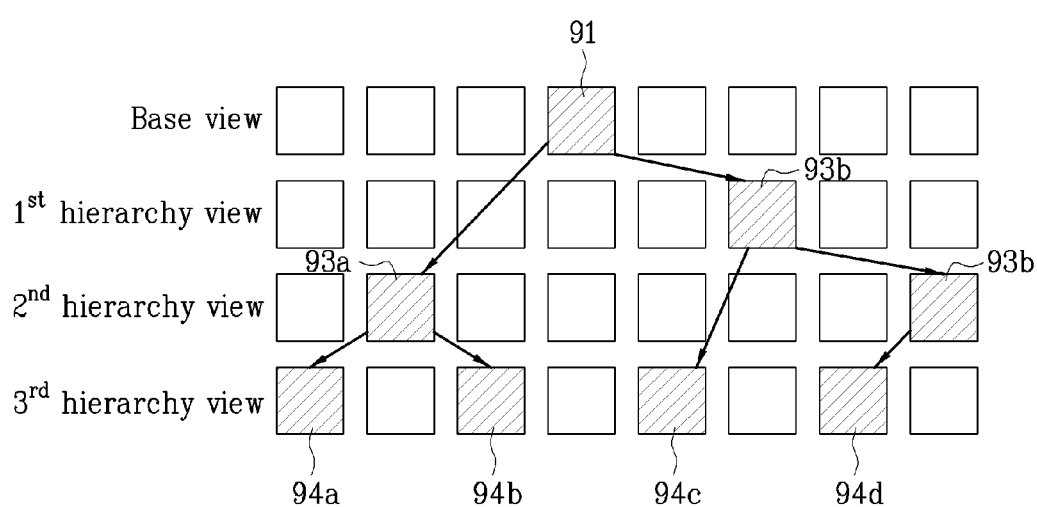

FIGS. 9A-9B are conceptual diagrams illustrating a hierarchical prediction structure between several viewpoints of multiview sequence data. For example, FIG. 9A shows the implementation example of the case of FIG. 6A, and FIG. 9B shows the implementation example of the case of FIG. 7A. In more detail, if the multiview number (m) is set to "8", the base-view and three hierarchical auxiliary-views are provided, such that the hierarchical encoding (or "view scalability") between several viewpoints is made available during the encoding of the multiview sequence.

Individual pictures implemented by the abovementioned hierarchical auxiliary-view bitstreams are estimated/predicted on the basis of a picture of the base-view and/or a picture of an upper hierarchical auxiliary-view image, such that the encoding of the resultant pictures is performed. Specifically, the disparity estimation is generally used as the above-mentioned estimation.

For example, the first hierarchical auxiliary-view 92 performs the estimation/encoding process between viewpoints (i.e., estimation/encoding process of the multiview) by referring to the base-view 91. The second hierarchical auxiliary-views (93a and 93b) perform the estimation/encoding process between viewpoints by referring to the base-view 91 and/or the first hierarchical auxiliary-view 92. The third hierarchical auxiliary-views (94a, 94b, 94c, and 94d) perform the estimation/encoding process between viewpoints by referring to the base-view and the first hierarchical auxiliary-view 92, and/or the second hierarchical auxiliary-views (93a and 93b). In association with the above-mentioned description, the arrows of drawings indicate progressing directions of the above-mentioned estimation/encoding process of the multiview, and it can be recognized that auxiliary streams contained in the same hierarchy may refer to different views as necessary. The above-mentioned hierarchically-encoded bitstream is selectively decoded in the reception end according to display characteristics, and a detailed description thereof will be described later with reference to FIG. 12.

Generally, the prediction structure of the encoder may be changed to another structure, such that the decoder can easily recognize the prediction structure relationship of individual view images by transmission of information indicating the relationship of individual views. Also, specific information, indicating which one of levels from among the entire view hierarchy includes the individual views, may also be transmitted to the decoder.

Provided that the view level (view_level) is assigned to respective images (or slices), and a dependency relationship between the view images is given, even if the prediction structure is changed in various ways by the encoder, the decoder can easily recognize the changed prediction structure. In this case, the prediction structure/direction information of the respective views may be configured in the form of a matrix, such that the matrix-type prediction structure/direction information is transmitted to a destination. In other words, the number of views (num_view) is transmitted to the decoder, and the dependency relationship of the respective views may also be represented by a two-dimensional (2D) matrix.

If the dependency relationship of the views is changed in time, for example, if the dependency relationship of first frames of each GOP is different from that of other frames of the remaining time zones, the dependency-relationship matrix information associated with individual cases may be transmitted.

Figure 10A:
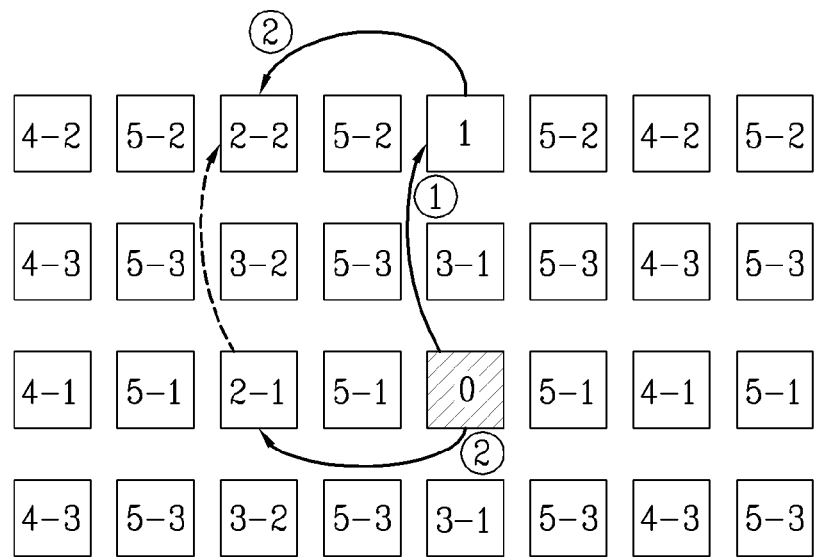
FIGS. 10A-10B are diagrams illustrating a prediction structure of two-dimensional (2D) multiview sequence data.
Figure 10B:
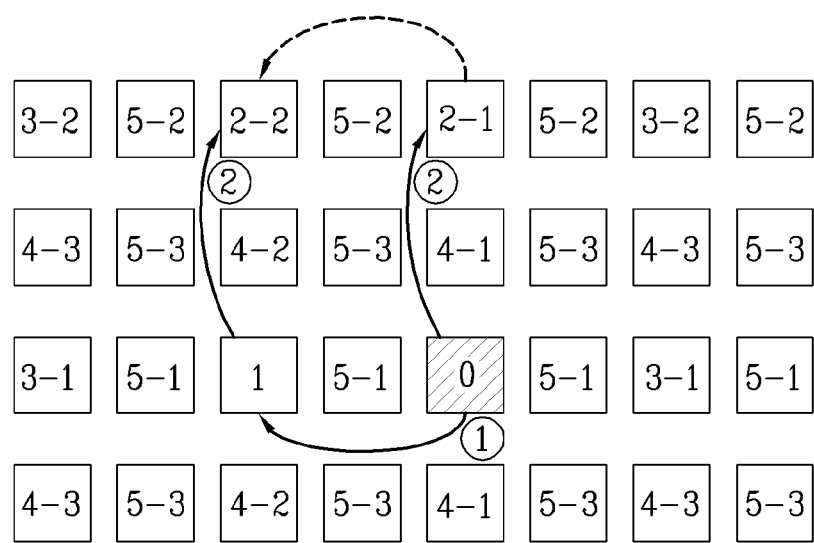

FIGS. 10A-10B are conceptual diagrams illustrating a prediction structure of two-dimensional (2D) multiview sequence according to a fourth example.

The above-mentioned first to third examples have disclosed the multiview of a one-dimensional array as examples. It should be noted that they can also be applied to two-dimensional (2D) multiview sequence as necessary.

In FIGS. 10A-10B, squares indicate individual views arranged in the form of a 2D, and numerals contained in the squares indicate the relationship of hierarchical views.

For example, if the square number is configured in the form of "A-B", "A" indicates a corresponding hierarchical auxiliary-view, and "B" indicates priority in the same hierarchical auxiliary-view.

As for numerals contained in the square areas, the number "0" is indicative of a base-view, the number "1" is indicative of a first hierarchical auxiliary-view, the number "2-1" or "2-2" is indicative of a second hierarchical auxiliary-view, the number "3-1" or "3-2" is indicative of a third hierarchical auxiliary-view, the number "4-1", "4-2" or "4-3" is indicative of a fourth hierarchical auxiliary-view, and the number "5-1", "5-2", or "5-3" is indicative of a fifth hierarchical auxiliary-view.

In conclusion, in the case of generating a bitstream by encoding images acquired from the two-dimensional (2D) multiview, if the 2D multiview number (m) on a horizontal axis is $2^{n-1} < m \leq 2^n$ and the 2D multiview number (p) on a vertical axis is $2^{k-1} < p \leq 2^k$, the above-mentioned bitstream includes a single base-view bitstream and (n+k) hierarchical auxiliary-view bitstreams.

In more detail, the above-mentioned (n+k) hierarchical auxiliary-views are formed alternately on the horizontal axis and the vertical axis. For example, a first hierarchical auxiliary-view from among the (n+k) hierarchical auxiliary-views in FIG. 10A is positioned at the vertical axis including the base-view. A first hierarchical auxiliary-view from among the (n+k) hierarchical auxiliary-views in FIG. 10B is positioned at the horizontal axis including the base-view.

For example, as shown in FIG. 10A, if the multiview number of the horizontal axis (m) is set to "8" (i.e., n=3), and the multiview number of the vertical axis (p) is set to "4" (i.e., k=2), the bitstream includes a single base-view and five hierarchical auxiliary-views. In association with the above-mentioned description, FIG. 10A shows that the hierarchical auxiliary-views are selected in the order of "vertical axis→horizontal axis→vertical axis→ . . . ". A method for determining locations of the base-view and the auxiliary-views will hereinafter be described as follows.

Firstly, the base-view location is determined in the same manner as in the above-mentioned one-dimensional array. Therefore, the base-view location is determined to be a specific view corresponding to a $2^{n-1}$-th location in the direction of the horizontal axis and $2^{k-1}$-th location in the direction of the vertical axis.

The first hierarchical auxiliary-view location is determined to be a top-side view or bottom-side view spaced apart from the base-view location in the direction of the vertical axis by the $2^{k-2}$-th magnitude, as denoted by ①. The second hierarchical auxiliary-view locations are determined to be left-side views, as denoted by ② or right-side views spaced apart from the base-view location and the first hierarchical auxiliary-view in the direction of the horizontal axis by the $2^{n-2}$-th magnitude. The third hierarchical auxiliary-view locations are determined to be the remaining views contained in the vertical axes including not only the first and second hierarchical auxiliary-views but also the base-view. The fourth hierarchical auxiliary-view location is determined to be a left-side view or right-side view spaced apart from the first to third hierarchical auxiliary-views and the base-view in the direction of the horizontal axis by the $2^{n-2}$-th magnitude. Finally, the fifth hierarchical auxiliary-view locations are determined to be the remaining views other than the base-view and the first to fourth hierarchical auxiliary-views.

For example, as can be seen from FIG. 10B, if the multiview number of the horizontal axis (m) is set to "8" (i.e., n=3), and the multiview number of the vertical axis (p) is set to "4" (i.e., k=2), the bitstream includes a single base-view and five hierarchical auxiliary-views. In association with the above-mentioned description, FIG. 10B shows that the hierarchical auxiliary-views are selected in the order of "horizontal axis→vertical axis→horizontal→ . . . ". A method for determining locations of the base-view and the auxiliary-views will hereinafter be described as follows.

Firstly, the base-view location is determined in the same manner as in the above-mentioned one-dimensional array. Therefore, the base-view location is determined to be a specific view corresponding to a $2^{n-1}$-th location in the direction of the horizontal axis and $2^{k-1}$-th location in the direction of the vertical axis.

The first hierarchical auxiliary-view location is determined to be a left-side view or right-side view spaced apart from the base-view location in the direction of the horizontal axis by the $2^{n-2}$-th magnitude, as denoted by ①. The second hierarchical auxiliary-view locations are determined to be top-side views, as denoted by ② or bottom-side views spaced apart from the base-view and the first hierarchical auxiliary-view in the direction of the vertical axis by the $2^{k-1}$-th magnitude. The third hierarchical auxiliary-view locations are determined to be left- and right-direction views spaced apart from the base-view and the first to second hierarchical auxiliary-views in the direction of the horizontal axis by the $2^{n-2}$-th magnitude. The fourth hierarchical auxiliary-view locations are determined to be the remaining views contained in the vertical axes including not only the first to third hierarchical auxiliary-views but also the base-view. Finally, the fifth hierarchical auxiliary-view locations are determined to be the remaining views other than the base-view and the first to fourth hierarchical auxiliary-views.

Figure 11B:
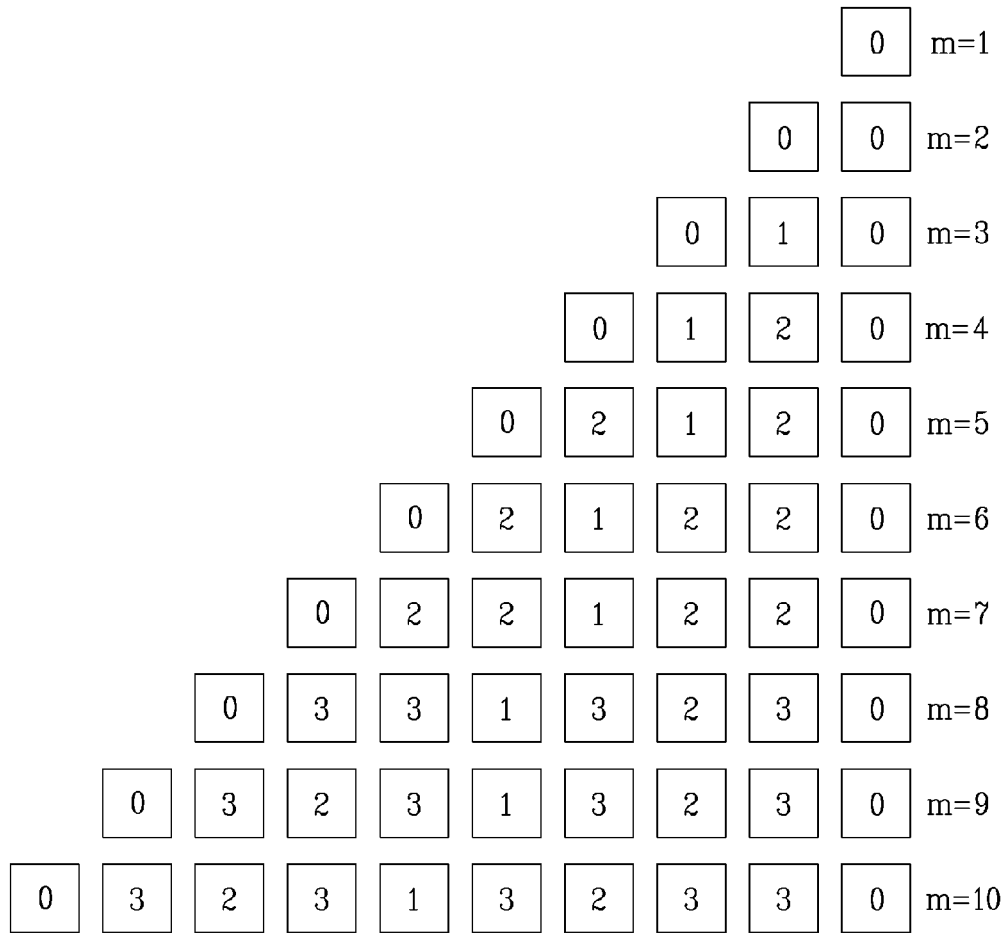
Figure 11C:
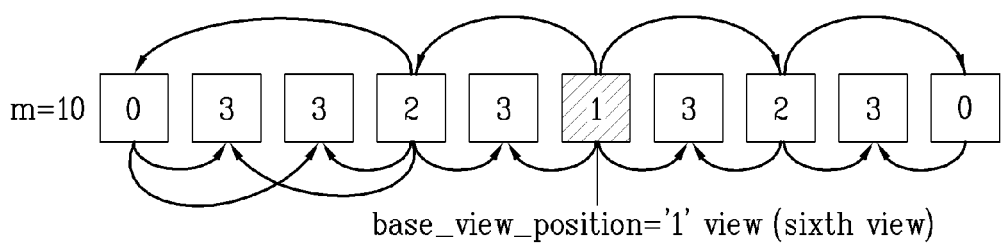

FIGS. 11A-11C are conceptual diagrams illustrating a multiview-sequence prediction structure according to a fifth example. The fifth example of FIGS. 11A-11C has prediction-structure rules different from those of the above-mentioned first to fourth examples. For example, the square areas of FIGS. 11A-11C indicate individual views, however, numerals contained in the square areas indicate the order of prediction of the views. In other words, as for numerals contained in the square areas, the number "0" is indicative of a first predicted view (or a first view), the number "1" is indicative of a second predicted view (or a second view), the number "2" is indicative of a third predicted view (or a third view), and the number "3" is indicative of a fourth predicted view (or a fourth view).

For example, FIG. 11A shows decision formats of the first to fourth views in case the multiview number (m) is denoted by m=1~m=10. The first to fourth views are determined by the following rules.

For example, both ends of the multiview are set to the first view (0), and the center view from among the multiview is set to the second view (1). Views successively arranged by skipping over at least one view in both directions on the basis of the second view (1) are set to the third views (2), respectively. The remaining views other than the first to third views are set to the fourth views (3), respectively. If the first to fourth views are determined as described above, there is a need to discriminate between the base-view and the auxiliary-view. For example, any one of the first view, the second view, and third view is set to the base-view, and the remaining views other than the base-view may be set to the auxiliary-views.

Provided that the base-view is not determined by the prescribed rules described above and is arbitrarily selected by the encoder, identification (ID) information (i.e., "base_view_position") of the base-view location may be contained in the bitstream.

FIG. 11B shows another example of the decision of the second view (1). In more detail, FIG. 11B shows another example different from the example of FIG. 11A, such that it shows an exemplary case in which the remaining views other than the first view (0) are set to even numbers. In other words, if m=4, m=6, m=8, or m=10, the second view (1) of FIG. 11B may be different from the second view (1) of FIG. 11A as necessary. For another example, in the case of determining views located after the second view (1), upper views may be determined by sequentially skipping over a single view on the basis of the leftmost first view (0).

In association with the above-mentioned description, FIG. 11C shows an exemplary case in which the multiview number (m) is 10 (i.e., m=10), and the base-view from among the multiview is denoted by "base_view_position='1' view" (corresponding to a sixth view) by the base-view ID information. For example, as can be seen from FIG. 11C, the first hierarchical auxiliary-view is set to the third view (2), the second hierarchical auxiliary-view is set to the first view (0), and the third hierarchical auxiliary-view is set to the fourth view (3).

In association with the above-mentioned description, in FIGS. 11A-11B, the base-view may also be set to the first view (1) as shown in FIG. 11C. The reason is that if the base-view is located at a specific location in the vicinity of the center part of the multiview, or is located at the center part of the multiview, the estimation/encoding process of other auxiliary-views can be effectively performed. Therefore, the base-view location and the auxiliary-view location can be determined according to the following rules.

In other words, the base-view location is set to the center view (1) of the multiview, the second auxiliary-view location is set to both-end views (0) of the multiview, and the first auxiliary-view location is set to the view (2) successively arranged by skipping over at least one view in both directions on the basis of the base-view. The remaining views (3) other than the above-mentioned views are all set to the third auxiliary-views.

In association with the above-mentioned description, if the multiview number (m) is equal to or less than "7" (i.e., m≦7), only two or less views are arranged between the base-view (1) and the second auxiliary-view (0), all the views arranged between the base-view (1) and the second auxiliary-view (0) are set to the first auxiliary-views (2), respectively.

If the multiview number (m) is equal to or more than "8" (i.e., m≧8) and only two or less views are arranged between the second auxiliary-view (0) and the first auxiliary-view (2), all the views arranged between the second auxiliary-view (0) and the first auxiliary-view (2) are set to the third auxiliary-views (3), respectively.

For example, as depicted in FIGS. 11A-11B, if m=8, m=9, and m=10, it can be recognized that one or two views located between the second auxiliary-view (0) and the first auxiliary-view (2) are set to the third auxiliary-views (3), respectively.

For another example, if only two or less views are located between the base-view (1) and the second auxiliary-view (0), all the views arranged between the base-view (1) and the second auxiliary-view (0) may be set to the third auxiliary-views (3), respectively. For example, as shown in FIGS. 11A~11B, if m=8, it can be recognized that two views located between the base-view (1) and the second auxiliary-view (0) are set to the third auxiliary-views (3), respectively.

Using the base-view and the auxiliary-views determined by the above-mentioned method, the view scalability between views (or viewpoints) can be performed.

For example, if the multiview number (m) is equal to or less than "7" (i.e., m≦7), a single base-view stream and two hierarchical auxiliary-view bitstreams are generated. For example, the second auxiliary-view (0) can be set to the first hierarchical auxiliary-view, and the first auxiliary-view (2) can also be set to the second hierarchical auxiliary-view.

For example, if the multiview number (m) is equal to or higher than "8" (i.e., m≧8), i.e., if m=8, m=9, or m=10, a single base-view bitstream and three hierarchical auxiliary-view bitstreams are generated. For example, the first auxiliary-view (2) is selected as the first hierarchical auxiliary-view, the second auxiliary-view (0) is selected as the first hierarchical auxiliary-view, and the third auxiliary-view (3) is selected as the third hierarchical auxiliary-view.

FIG. 12 is a conceptual diagram illustrating a hierarchical method of encoding/decoding a multiview sequence.

Referring to FIG. 12, the encoder of a transmission end performs the view scalability function of the multiview sequence using modified methods which may be predicted by the first through fifth embodiments and methods shown in the first to fifth examples, for generating a bitstream, and transmits the bitstream to the reception end.

Therefore, the decoding method or apparatus receives the bitstream formed by the above-mentioned characteristics, decodes the received bitstream, and generates decoded data for each hierarchy. Thereafter, according to the selection of a user or display, a variety of displays can be implemented, using data decoded by each hierarchy.

For example, a base layer 121 for reproducing data of only the base-view is appropriate for the 2D display 125. A first enhancement layer #1 (122) for reproducing data of the base-view and data of the first hierarchical auxiliary-view together is appropriate for a stereo-type display 126 formed by a combination of two 2D images. A second enhancement layer #2 (123) for reproducing data of the base-view, data of the first hierarchical auxiliary-view, and data of the second hierarchical auxiliary-view together is appropriate for a low multiview display 127 for 3D-reproduction of the multiview sequence. A third enhancement layer #3 (124) for reproducing data of the base-view and data of all hierarchical auxiliary-views together is appropriate for a high multiview display 128 for 3D-reproduction of the multiview sequence.

What is claimed is:

1. A method for decoding multi-view video data in a multi-view video data stream, with a decoder, the method comprising:

obtaining, with a Network Abstraction Layer parsing unit, inter-view prediction structure information of a random access picture and a non-random access picture from a sequence area in the multi-view video data stream, the inter-view prediction structure information including number information and view identification information, the number information indicating a total number of views in the multi-view video data, and the view identification information providing a view identifier of each reference view in the multi-view video data as two dimension structure;

obtaining, with the Network Abstraction Layer parsing unit, a random access flag for inter-view prediction, the random access flag indicating whether a type of a current picture represents the random access picture or the non-random access picture, all slices in the random access picture referring only to slices having a same temporal position and being in a different view of the multi-view video data, the non-random access picture representing a picture other than the random access picture;

determining, with a decoded picture buffer unit, a reference picture list of a current slice in the current picture for inter-view prediction using the inter-view prediction structure information of the non-random access picture, when the current picture corresponds to the non-random access picture based on the random access flag;

determining, with an inter-prediction unit, a prediction value of a macroblock in the current slice based on the determined reference picture list for inter-view prediction; and decoding the macroblock in the current slice using the prediction value, wherein the decoder includes the Network Abstraction Layer parsing unit, the decoded picture buffer unit, and the inter-prediction unit.

2. The method of claim 1, wherein the inter-view prediction structure information includes number information and view identification information, the number information indicating a total number of views in the multi-view video data, and the view identification information providing a view identifier of each reference view in the multi-view video data.

3. The method of claim 1, wherein the inter-view prediction structure information of the non-random access picture is obtained by considering a predictive direction.

4. The method of claim 3, wherein the predictive direction represents a forward direction or a backward direction in the output order information.

5. The method of claim 1, wherein the inter-view prediction structure information is obtained from a sequence parameter set information of a multi-view video.

6. An apparatus for decoding a multi-view video data in a multi-view video data stream, comprising:

a Network Abstraction Layer parsing unit obtaining identification information representing the multi-view video data stream including inter-view prediction structure information, and obtaining inter-view picture structure information of a non-random access picture from the multi-view video data stream based on the identification information, the non-random access picture representing a picture other than an random access picture, obtaining random access flag from the multi-view video data stream, the random access flag indicating whether a type of a current picture is the random access picture, all slices in the random access picture referring only slices having a same temporal position and being in a different view of the multi-view video data;

an inter-prediction unit deriving a prediction value of the current picture using the inter-view prediction structure information of the non-random access picture, and a decoding unit decoding the current picture using the prediction value, wherein the current picture corresponds to the non-random access picture, wherein the inter-view prediction structure information indicates reference relation between a plurality of views.

7. The apparatus of claim 6, wherein the inter-view prediction structure information includes number information and view identification information, the number information indicating a total number of views in the multi-view video data, and the view identification information providing a view identifier of each reference view in the multi-view video data.

8. The apparatus of claim 6, wherein the inter-view prediction structure information of the non-random access picture is obtained by considering a predictive direction.

9. The apparatus of claim 8, wherein the predictive direction represents a forward direction or a backward direction in an output order of pictures.

10. The apparatus of claim 6, wherein the inter-view prediction structure information is obtained from a sequence parameter set information of a multi-view video.

* * * * *